US009336043B2

(12) United States Patent
Preston

(10) Patent No.: US 9,336,043 B2
(45) Date of Patent: *May 10, 2016

(54) METHOD AND APPARATUS FOR A TASK PRIORITY PROCESSING SYSTEM

(76) Inventor: Dan Alan Preston, Bainbridge Island, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/246,405

(22) Filed: Sep. 27, 2011

(65) Prior Publication Data

US 2012/0083971 A1     Apr. 5, 2012

Related U.S. Application Data

(63) Continuation of application No. 12/483,214, filed on Jun. 11, 2009, and a continuation of application No. 11/462,958, filed on Aug. 7, 2006, now Pat. No. 7,778,739, and a continuation of application No. 09/841,915, filed on Apr. 24, 2001, now Pat. No. 7,146,260.

(51) Int. Cl.
*H04L 12/28*     (2006.01)
*H04W 4/00*     (2009.01)
(Continued)

(52) U.S. Cl.
CPC . *G06F 9/46* (2013.01); *B60R 25/00* (2013.01); *G06F 11/2028* (2013.01); *G06F 11/2035* (2013.01); *G06F 11/2046* (2013.01); *G06F 11/3013* (2013.01); *G06F 11/3051* (2013.01); *G06F 11/328* (2013.01); *G06F 13/4081* (2013.01); *G06Q 30/0641* (2013.01); *G07C 5/08* (2013.01); *H04L 12/24* (2013.01);
(Continued)

(58) Field of Classification Search
CPC . H04L 12/24; H04L 12/403; H04L 12/40169; H04L 67/12; H04L 67/125; G06F 11/328; G06F 11/2028; G06F 11/2035; G06F 11/2046; G06F 11/3013; G06F 13/4081
See application file for complete search history.

(56) References Cited

U.S. PATENT DOCUMENTS 2,995,318 A     8/1961     Cocharo
3,812,468 A     5/1974     Wollum et al.
(Continued)

FOREIGN PATENT DOCUMENTS

DE     3125161     1/1983
DE     4237987     5/1994
(Continued)

OTHER PUBLICATIONS

Robert Bosch GmbH, "CAN Specification, Version 2.0," Sep. 1991.
(Continued)

*Primary Examiner* — Steven H Nguyen

(57) ABSTRACT

A vehicle system comprises multiple processors and a communication system adapted to run real-time vehicle applications. The system adds new devices, identifies data generated by the new device and identifies another device that can input or output the data. The vehicle system also includes a dynamic configuration system configured to operate on the multiple processors and store critical information about the applications running on the multiple processors. The configuration manager automatically detects an application failure and initiates a reconfiguration process. The configuration manager then downloads from memory the previously stored critical data associated with the failed application and initiates a reboot operation for the failed application.

16 Claims, 21 Drawing Sheets

(51) Int. Cl.

| | | |
|---|---|---|
| *G06F 9/46* | (2006.01) | |
| *B60R 25/00* | (2013.01) | |
| *G06Q 30/06* | (2012.01) | |
| *H04L 12/24* | (2006.01) | |
| *H04L 12/40* | (2006.01) | |
| *H04L 12/403* | (2006.01) | |
| *G06F 11/20* | (2006.01) | |
| *G06F 11/30* | (2006.01) | |
| *G06F 11/32* | (2006.01) | |
| *G07C 5/08* | (2006.01) | |
| *H04L 29/08* | (2006.01) | |
| *G06F 13/40* | (2006.01) | |

(52) U.S. Cl.
CPC ........ *H04L 12/403* (2013.01); *H04L 12/40169* (2013.01); *H04L 41/00* (2013.01); *H04L 41/0809* (2013.01); *H04L 67/12* (2013.01); *H04L 67/125* (2013.01); *H04L 2012/40273* (2013.01); *Y10T 307/50* (2015.04)

(56) References Cited

U.S. PATENT DOCUMENTS

| | | | |
|---|---|---|---|
| 4,303,978 | A | 12/1981 | Shaw |
| 4,528,563 | A | 7/1985 | Takeuchi |
| 4,558,460 | A | 12/1985 | Tanaka |
| 4,591,976 | A | 5/1986 | Webber |
| 4,735,274 | A | 4/1988 | Good et al. |
| 4,829,434 | A | 5/1989 | Karmel |
| 4,835,537 | A | 5/1989 | Manion |
| 4,907,159 | A | 3/1990 | Mauge |
| 4,931,930 | A | 6/1990 | Shyu et al. |
| 4,959,800 | A | 9/1990 | Woolley et al. |
| 5,008,678 | A | 4/1991 | Herman |
| 5,027,432 | A | 6/1991 | Skala |
| 5,031,330 | A | 7/1991 | Stuart |
| 5,045,937 | A | 9/1991 | Myrick |
| 5,111,401 | A | 5/1992 | Everett, Jr. |
| 5,115,245 | A | 5/1992 | Wen |
| 5,243,640 | A | 9/1993 | Hadley et al. |
| 5,245,909 | A | 9/1993 | Corrigan |
| 5,287,199 | A | 2/1994 | Zoccolillo |
| 5,303,297 | A | 4/1994 | Hillis |
| 5,339,086 | A | 8/1994 | DeLuca |
| 5,341,301 | A | 8/1994 | Shirai |
| 5,438,361 | A | 8/1995 | Coleman |
| 5,440,726 | A * | 8/1995 | Fuchs et al. ................ 714/20 |
| 5,471,214 | A | 11/1995 | Faibish |
| 5,485,892 | A | 1/1996 | Fujita |
| 5,500,794 | A | 3/1996 | Fujita et al. |
| 5,506,963 | A | 4/1996 | Ducateau |
| 5,532,706 | A | 7/1996 | Reinhardt |
| 5,537,539 | A * | 7/1996 | Narihiro ................ 714/38.11 |
| 5,552,773 | A | 9/1996 | Kuhnert |
| 5,555,503 | A | 9/1996 | Kyrtsos et al. |
| 5,572,201 | A | 11/1996 | Graham |
| 5,579,219 | A | 11/1996 | Mori et al. |
| 5,581,462 | A | 12/1996 | Rogers |
| 5,585,798 | A | 12/1996 | Yoshioka |
| 5,617,085 | A | 4/1997 | Tsutsumi |
| 5,646,612 | A | 7/1997 | Byon |
| 5,661,811 | A | 8/1997 | Huemann et al. |
| 5,742,141 | A | 4/1998 | Czekaj |
| 5,749,060 | A | 5/1998 | Graf |
| 5,751,211 | A | 5/1998 | Shirai |
| 5,754,123 | A | 5/1998 | Nashif et al. |
| 5,761,320 | A | 6/1998 | Farinelli |
| 5,786,998 | A | 7/1998 | Neeson |
| 5,787,246 | A | 7/1998 | Lichtman |
| 5,793,366 | A | 8/1998 | Mano et al. |
| 5,794,164 | A | 8/1998 | Beckert et al. |
| 5,859,878 | A | 1/1999 | Phillips et al. |
| 5,872,508 | A | 2/1999 | Taoka |
| 5,898,392 | A | 4/1999 | Bambini |
| 5,907,293 | A | 5/1999 | Tognazzini |
| 5,909,559 | A | 6/1999 | So |
| 5,915,214 | A | 6/1999 | Reece |
| 5,943,427 | A | 8/1999 | Massie |
| 5,948,040 | A | 9/1999 | DeLorme et al. |
| 5,951,620 | A | 9/1999 | Ahrens et al. |
| 5,956,016 | A | 9/1999 | Kuenzner et al. |
| 5,956,025 | A | 9/1999 | Goulden et al. |
| 5,956,250 | A | 9/1999 | Gudat et al. |
| 5,957,985 | A | 9/1999 | Wong |
| 5,959,536 | A * | 9/1999 | Chambers et al. ............ 710/104 |
| 5,963,092 | A | 10/1999 | VanZalinge |
| 5,964,822 | A | 10/1999 | Alland |
| 5,966,658 | A | 10/1999 | Kennedy, III |
| 5,969,598 | A | 10/1999 | Kimura |
| 5,974,554 | A | 10/1999 | Oh |
| 5,977,906 | A | 11/1999 | Ameen |
| 5,983,092 | A | 11/1999 | Whinnett |
| 5,983,161 | A | 11/1999 | Lemelson |
| 6,009,330 | A | 12/1999 | Kennedy, III |
| 6,009,403 | A | 12/1999 | Sato |
| 6,028,537 | A | 2/2000 | Suman |
| 6,028,548 | A | 2/2000 | Farmer |
| 6,032,089 | A | 2/2000 | Buckley |
| 6,032,202 | A | 2/2000 | Lea et al. |
| 6,037,860 | A | 3/2000 | Zander et al. |
| 6,038,625 | A | 3/2000 | Ogino et al. |
| 6,052,632 | A | 4/2000 | Iihoshi |
| 6,054,950 | A | 4/2000 | Fontana |
| 6,060,989 | A | 5/2000 | Gehlot |
| 6,061,002 | A | 5/2000 | Weber et al. |
| 6,061,709 | A | 5/2000 | Bronte |
| 6,075,467 | A | 6/2000 | Ninagawa |
| 6,097,285 | A | 8/2000 | Curtin |
| 6,097,314 | A | 8/2000 | Desens et al. |
| 6,105,119 | A | 8/2000 | Kerr et al. |
| 6,128,608 | A | 10/2000 | Barnhill |
| 6,144,336 | A | 11/2000 | Preston et al. |
| 6,148,261 | A | 11/2000 | Obradovich |
| 6,150,961 | A | 11/2000 | Alewine |
| 6,154,123 | A | 11/2000 | Kleinberg |
| 6,161,071 | A | 12/2000 | Shuman |
| 6,163,711 | A | 12/2000 | Juntunen |
| 6,166,627 | A | 12/2000 | Reeley |
| 6,167,253 | A | 12/2000 | Farris |
| 6,169,894 | B1 | 1/2001 | McCormick |
| 6,175,728 | B1 | 1/2001 | Mitama |
| 6,175,782 | B1 | 1/2001 | Obradovich |
| 6,179,489 | B1 | 1/2001 | So et al. |
| 6,181,922 | B1 | 1/2001 | Iwai |
| 6,181,994 | B1 | 1/2001 | Colson |
| 6,182,006 | B1 | 1/2001 | Meek |
| 6,185,491 | B1 * | 2/2001 | Gray et al. ................ 701/36 |
| 6,195,760 | B1 | 2/2001 | Chung et al. |
| 6,198,996 | B1 | 3/2001 | Berstis |
| 6,199,136 | B1 | 3/2001 | Shteyn |
| 6,202,027 | B1 | 3/2001 | Alland |
| 6,203,366 | B1 | 3/2001 | Muller |
| 6,204,804 | B1 | 3/2001 | Andersson |
| 6,226,389 | B1 | 5/2001 | Lemelson, III |
| 6,233,468 | B1 | 5/2001 | Chen |
| 6,236,652 | B1 | 5/2001 | Preston |
| 6,240,365 | B1 | 5/2001 | Bunn |
| 6,243,450 | B1 | 6/2001 | Jansen |
| 6,243,645 | B1 | 6/2001 | Moteki et al. |
| 6,243,772 | B1 | 6/2001 | Ghori et al. |
| 6,247,079 | B1 | 6/2001 | Papa et al. |
| 6,247,144 | B1 | 6/2001 | Macias-Garza et al. |
| 6,252,544 | B1 | 6/2001 | Hoffberg |
| 6,275,231 | B1 | 8/2001 | Obradovich |
| 6,282,714 | B1 | 8/2001 | Ghori et al. |
| D448,366 | S | 9/2001 | Youngers |
| 6,292,109 | B1 | 9/2001 | Murano |
| 6,292,136 | B1 | 9/2001 | Egnell |
| 6,292,747 | B1 | 9/2001 | Amro |
| 6,294,987 | B1 | 9/2001 | Matsuda |
| 6,295,541 | B1 | 9/2001 | Bodnar et al. |
| 6,297,732 | B2 | 10/2001 | Hsu |
| 6,298,302 | B2 | 10/2001 | Walgers |

(56) References Cited

U.S. PATENT DOCUMENTS

| | | | |
|---|---|---|---|
| 6,298,370 B1 | 10/2001 | Tang et al. | |
| 6,314,326 B1 | 11/2001 | Fuchu | |
| 6,321,344 B1 | 11/2001 | Fenchel | |
| 6,326,903 B1 | 12/2001 | Gross | |
| 6,327,536 B1 | 12/2001 | Tsuji | |
| 6,362,748 B1 | 3/2002 | Huang | |
| 6,370,449 B1 | 4/2002 | Razavi et al. | |
| 6,374,286 B1 | 4/2002 | Gee | |
| 6,377,860 B1 | 4/2002 | Gray | |
| 6,382,897 B2 | 5/2002 | Mattio | |
| 6,389,340 B1 | 5/2002 | Rayner | |
| 6,401,029 B1 | 6/2002 | Kubota | |
| 6,405,132 B1 | 6/2002 | Breed | |
| 6,408,174 B1 | 6/2002 | Steijer | |
| 6,417,782 B1 | 7/2002 | Darnall | |
| 6,421,429 B1 | 7/2002 | Merritt | |
| 6,429,789 B1 | 8/2002 | Kiridena | |
| 6,429,812 B1 | 8/2002 | Hoffberg | |
| 6,430,164 B1 * | 8/2002 | Jones et al. | 370/313 |
| 6,433,679 B1 | 8/2002 | Schmid | |
| 6,434,447 B1 | 8/2002 | Shteyn | |
| 6,442,485 B2 | 8/2002 | Evans | |
| 6,445,308 B1 | 9/2002 | Koike | |
| 6,445,983 B1 | 9/2002 | Dickson et al. | |
| 6,449,541 B1 | 9/2002 | Goldberg et al. | |
| 6,452,484 B1 | 9/2002 | Drori | |
| 6,463,373 B2 | 10/2002 | Suganuma | |
| 6,484,080 B2 | 11/2002 | Breed | |
| 6,487,717 B1 | 11/2002 | Brunemann et al. | |
| 6,489,884 B1 | 12/2002 | Lamberson et al. | |
| 6,493,338 B1 | 12/2002 | Preston | |
| 6,496,107 B1 | 12/2002 | Himmelstein | |
| 6,496,117 B2 | 12/2002 | Gutta | |
| 6,496,689 B1 | 12/2002 | Keller | |
| 6,498,939 B1 | 12/2002 | Thomas | |
| 6,505,100 B1 | 1/2003 | Stuempfle | |
| 6,515,595 B1 | 2/2003 | Obradovich | |
| 6,522,875 B1 | 2/2003 | Dowling | |
| 6,523,696 B1 | 2/2003 | Saito et al. | |
| 6,526,335 B1 | 2/2003 | Treyz et al. | |
| 6,542,812 B1 | 4/2003 | Obradovich et al. | |
| 6,542,814 B2 | 4/2003 | Polidi et al. | |
| 6,559,773 B1 * | 5/2003 | Berry | 340/815.4 |
| 6,567,069 B1 | 5/2003 | Bontrager et al. | |
| 6,571,136 B1 | 5/2003 | Staiger | |
| 6,574,734 B1 | 6/2003 | Colson et al. | |
| 6,580,973 B2 | 6/2003 | Leivian et al. | |
| 6,584,403 B2 | 6/2003 | Bunn | |
| D479,228 S | 9/2003 | Sakaguchi et al. | |
| 6,614,349 B1 | 9/2003 | Proctor et al. | |
| 6,615,137 B2 | 9/2003 | Lutter | |
| 6,616,071 B2 | 9/2003 | Kitamura | |
| 6,622,083 B1 | 9/2003 | Knockeart | |
| 6,629,033 B2 | 9/2003 | Preston | |
| 6,641,087 B1 | 11/2003 | Nelson | |
| 6,647,270 B1 | 11/2003 | Himmelstein | |
| 6,647,328 B2 | 11/2003 | Walker | |
| 6,670,912 B2 | 12/2003 | Honda | |
| 6,675,081 B2 | 1/2004 | Shuman | |
| 6,678,892 B1 | 1/2004 | Lavelle et al. | |
| 6,681,121 B1 | 1/2004 | Preston | |
| 6,690,681 B1 | 2/2004 | Preston | |
| 6,707,421 B1 | 3/2004 | Drury et al. | |
| 6,708,100 B2 | 3/2004 | Russell | |
| 6,714,139 B2 | 3/2004 | Saito | |
| 6,718,187 B1 | 4/2004 | Takagi et al. | |
| 6,725,031 B2 | 4/2004 | Watler | |
| 6,734,799 B2 | 5/2004 | Munch | |
| 6,738,697 B2 | 5/2004 | Breed | |
| 6,748,278 B1 | 6/2004 | Maymudes et al. | |
| 6,754,183 B1 | 6/2004 | Razavi et al. | |
| 6,756,998 B1 | 6/2004 | Bilger | |
| 6,765,495 B1 | 7/2004 | Dunning et al. | |
| 6,771,208 B2 | 8/2004 | Lutter | |
| 6,771,629 B1 | 8/2004 | Preston | |
| 6,778,073 B2 | 8/2004 | Lutter | |
| 6,778,924 B2 | 8/2004 | Hanse | |
| 6,782,315 B2 | 8/2004 | Lu | |
| 6,785,551 B1 | 8/2004 | Richard | |
| 6,792,351 B2 | 9/2004 | Lutter | |
| 6,799,092 B2 | 9/2004 | Lu | |
| 6,801,994 B2 | 10/2004 | Beckert et al. | |
| 6,806,977 B1 | 10/2004 | Freeny et al. | |
| 6,816,458 B1 | 11/2004 | Kroon | |
| 6,876,642 B1 | 4/2005 | Adams | |
| 6,892,230 B1 | 5/2005 | Gu et al. | |
| 6,895,238 B2 | 5/2005 | Newell | |
| 6,895,240 B2 | 5/2005 | Laursen | |
| 6,901,057 B2 | 5/2005 | Rune | |
| 6,906,619 B2 | 6/2005 | Williams | |
| 6,917,801 B2 | 7/2005 | Witte et al. | |
| 6,920,129 B2 | 7/2005 | Preston | |
| 6,925,368 B2 | 8/2005 | Funkhouser et al. | |
| 6,937,732 B2 | 8/2005 | Ohmura | |
| 6,952,155 B2 | 10/2005 | Himmelstein | |
| 6,968,513 B1 | 11/2005 | Rinebold et al. | |
| 6,972,669 B2 | 12/2005 | Saito | |
| 6,973,030 B2 | 12/2005 | Pecen | |
| 6,980,092 B2 | 12/2005 | Turnbull | |
| 6,993,511 B2 | 1/2006 | Himmelstein | |
| 7,000,469 B2 | 2/2006 | Foxlin | |
| 7,006,950 B1 | 2/2006 | Greiffenhagen | |
| 7,024,363 B1 | 4/2006 | Comerford | |
| 7,039,858 B2 | 5/2006 | Humpleman et al. | |
| 7,079,993 B2 | 7/2006 | Stephenson | |
| 7,085,710 B1 | 8/2006 | Beckert et al. | |
| 7,089,206 B2 | 8/2006 | Martin | |
| 7,092,723 B2 | 8/2006 | Himmelstein | |
| 7,103,646 B1 | 9/2006 | Suzuki | |
| 7,103,834 B1 | 9/2006 | Humpleman et al. | |
| 7,120,129 B2 | 10/2006 | Ayyagari | |
| 7,123,926 B2 | 10/2006 | Himmelstein | |
| 7,146,260 B2 * | 12/2006 | Preston et al. | 701/24 |
| 7,151,768 B2 | 12/2006 | Preston | |
| 7,158,842 B2 | 1/2007 | Ohmura | |
| 7,158,956 B1 | 1/2007 | Himmelstein | |
| 7,164,662 B2 | 1/2007 | Preston | |
| 7,171,189 B2 | 1/2007 | Bianconi | |
| 7,178,049 B2 | 2/2007 | Lutter | |
| 7,187,947 B1 | 3/2007 | White | |
| 7,206,305 B2 | 4/2007 | Preston | |
| 7,207,042 B2 | 4/2007 | Smith | |
| 7,215,965 B2 | 5/2007 | Fournier et al. | |
| 7,216,347 B1 | 5/2007 | Harrison et al. | |
| 7,221,669 B2 | 5/2007 | Preston | |
| 7,239,949 B2 | 7/2007 | Lu | |
| 7,249,266 B2 | 7/2007 | Margalit | |
| 7,257,426 B1 | 8/2007 | Witkowski | |
| 7,263,332 B1 | 8/2007 | Nelson | |
| 7,269,188 B2 | 9/2007 | Smith | |
| 7,272,637 B1 | 9/2007 | Himmelstein | |
| 7,274,988 B2 | 9/2007 | Mukaiyama | |
| 7,277,693 B2 | 10/2007 | Chen | |
| 7,283,567 B2 | 10/2007 | Preston | |
| 7,283,904 B2 | 10/2007 | Benjamin | |
| 7,286,522 B2 | 10/2007 | Preston | |
| 7,289,906 B2 | 10/2007 | van der Merwe et al. | |
| 7,317,696 B2 | 1/2008 | Preston | |
| 7,337,650 B1 | 3/2008 | Preston | |
| 7,343,160 B2 | 3/2008 | Morton | |
| 7,375,728 B2 | 5/2008 | Donath | |
| 7,379,707 B2 | 5/2008 | DiFonzo | |
| 7,411,982 B2 | 8/2008 | Smith | |
| 7,418,476 B2 | 8/2008 | Salesky | |
| 7,426,437 B2 | 9/2008 | Breed | |
| 7,450,955 B2 | 11/2008 | Himmelstein | |
| 7,480,501 B2 | 1/2009 | Petite | |
| 7,483,964 B1 | 1/2009 | Jackson et al. | |
| 7,484,008 B1 | 1/2009 | Gelvin | |
| 7,493,645 B1 | 2/2009 | Tranchina | |
| 7,506,020 B2 | 3/2009 | Ellis | |
| 7,508,810 B2 | 3/2009 | Moinzadeh | |
| 7,509,134 B2 | 3/2009 | Fournier et al. | |
| 7,536,277 B2 | 5/2009 | Pattipatti et al. | |

(56) References Cited

U.S. PATENT DOCUMENTS

| | | | |
|---|---|---|---|
| 7,579,942 B2 | 8/2009 | Kalik | |
| 7,587,102 B2 | 9/2009 | Maris | |
| 7,587,370 B2 | 9/2009 | Himmelstein | |
| 7,594,000 B2 | 9/2009 | Himmelstein | |
| 7,596,391 B2 | 9/2009 | Himmelstein | |
| 7,599,715 B2 | 10/2009 | Himmelstein | |
| 7,610,331 B1 | 10/2009 | Genske | |
| 7,614,055 B2 | 11/2009 | Buskens et al. | |
| 7,664,315 B2 | 2/2010 | Woodfill | |
| 7,681,448 B1 | 3/2010 | Preston | |
| 7,689,321 B2 | 3/2010 | Karlsson | |
| 7,733,853 B2 | 6/2010 | Moinzadeh et al. | |
| 7,747,281 B2 | 6/2010 | Preston | |
| 7,778,739 B2 | 8/2010 | Preston et al. | |
| 7,848,763 B2 | 12/2010 | Fournier et al. | |
| 7,891,004 B1 | 2/2011 | Gelvin et al. | |
| 7,924,934 B2 | 4/2011 | Birmingham | |
| 7,928,898 B2 | 4/2011 | Fraenken | |
| 7,966,111 B2 | 6/2011 | Moinzadeh et al. | |
| 7,970,500 B2 | 6/2011 | Parra Carque | |
| 7,979,095 B2 | 7/2011 | Birmingham | |
| 7,983,310 B2 | 7/2011 | Hirano et al. | |
| 8,014,942 B2 | 9/2011 | Moinzadeh et al. | |
| 8,036,201 B2 | 10/2011 | Moinzadeh et al. | |
| 8,036,600 B2 | 10/2011 | Garrett et al. | |
| 8,045,729 B2 | 10/2011 | Preston et al. | |
| 8,063,347 B1 | 11/2011 | Urbano et al. | |
| 8,068,792 B2 | 11/2011 | Preston et al. | |
| 8,108,092 B2 | 1/2012 | Phillips et al. | |
| 8,165,057 B2 | 4/2012 | Preston et al. | |
| 8,204,927 B1 | 6/2012 | Duong et al. | |
| 8,244,408 B2 | 8/2012 | Lee et al. | |
| 8,260,515 B2 | 9/2012 | Huang et al. | |
| 8,331,279 B2 | 12/2012 | Preston et al. | |
| 8,346,186 B1 * | 1/2013 | Preston et al. | 455/99 |
| 8,751,712 B2 | 6/2014 | Preston et al. | |
| 8,958,315 B2 | 2/2015 | Preston et al. | |
| 2001/0009855 A1 | 7/2001 | L'Anson | |
| 2001/0033225 A1 * | 10/2001 | Razavi et al. | 340/425.5 |
| 2002/0012329 A1 | 1/2002 | Atkinson et al. | |
| 2002/0017567 A1 | 2/2002 | Connolly et al. | |
| 2002/0022927 A1 | 2/2002 | Lemelson et al. | |
| 2002/0070852 A1 | 6/2002 | Trauner | |
| 2002/0083143 A1 | 6/2002 | Cheng | |
| 2002/0085043 A1 | 7/2002 | Ribak | |
| 2002/0095501 A1 | 7/2002 | Chiloyan et al. | |
| 2002/0098878 A1 | 7/2002 | Mooney et al. | |
| 2002/0105423 A1 | 8/2002 | Rast | |
| 2002/0123325 A1 | 9/2002 | Cooper | |
| 2002/0144010 A1 | 10/2002 | Younis | |
| 2002/0144079 A1 | 10/2002 | Willis et al. | |
| 2003/0060188 A1 | 3/2003 | Gidron | |
| 2003/0078754 A1 | 4/2003 | Hamza | |
| 2003/0158614 A1 | 8/2003 | Friel | |
| 2003/0212996 A1 | 11/2003 | Wolzien | |
| 2004/0162064 A1 | 8/2004 | Himmelstein | |
| 2004/0164228 A1 | 8/2004 | Fogg | |
| 2005/0009506 A1 | 1/2005 | Smolentzov | |
| 2005/0070221 A1 | 3/2005 | Upton | |
| 2005/0130656 A1 | 6/2005 | Chen | |
| 2005/0153654 A1 | 7/2005 | Anderson | |
| 2005/0232469 A1 | 10/2005 | Schofield et al. | |
| 2005/0251328 A1 | 11/2005 | Merwe et al. | |
| 2005/0260984 A1 | 11/2005 | Karabinis | |
| 2005/0275505 A1 | 12/2005 | Himmelstein | |
| 2005/0278712 A1 | 12/2005 | Buskens et al. | |
| 2006/0132357 A1 | 6/2006 | Pozgay et al. | |
| 2006/0206576 A1 | 9/2006 | Obradovich et al. | |
| 2006/0293829 A1 | 12/2006 | Cornwell et al. | |
| 2007/0115868 A1 | 5/2007 | Chen | |
| 2007/0115897 A1 | 5/2007 | Chen | |
| 2007/0260372 A1 | 11/2007 | Langer | |
| 2007/0260373 A1 | 11/2007 | Langer et al. | |
| 2008/0092140 A1 | 4/2008 | Doninger et al. | |
| 2008/0169998 A1 | 7/2008 | Jacobsen et al. | |
| 2009/0090592 A1 | 4/2009 | Mordukhovich | |
| 2009/0240481 A1 | 9/2009 | Durrant-Whyte et al. | |
| 2009/0268923 A1 | 10/2009 | Li | |
| 2009/0268947 A1 | 10/2009 | Schaufler | |
| 2009/0284378 A1 | 11/2009 | Ferren et al. | |
| 2009/0319063 A1 | 12/2009 | Pan | |
| 2010/0017543 A1 | 1/2010 | Preston et al. | |
| 2011/0212700 A1 | 9/2011 | Petite | |
| 2012/0083971 A1 | 4/2012 | Preston et al. | |
| 2012/0183153 A1 | 7/2012 | Preston et al. | |

FOREIGN PATENT DOCUMENTS

| | | |
|---|---|---|
| DE | 19647283 A1 | 5/1997 |
| DE | 19922608 | 11/2000 |
| DE | 19931161 | 1/2001 |
| EP | 0355490 B1 | 2/1990 |
| EP | 0 441 576 | 8/1991 |
| EP | 0473866 A2 | 3/1992 |
| EP | 0 841 648 | 5/1998 |
| EP | 0841648 | 5/1998 |
| EP | 1 355 128 | 10/2003 |
| GB | 2097563 | 11/1982 |
| JP | 10-076115 | 10/1999 |
| JP | 2000207691 | 7/2000 |
| KR | 1995-0017619 | 7/1995 |
| KR | 1999-021740 | 3/1999 |
| WO | WO9624229 | 8/1996 |
| WO | WO9908436 | 2/1999 |
| WO | WO9957662 | 11/1999 |
| WO | WO9965183 | 12/1999 |
| WO | WO0029948 | 5/2000 |
| WO | WO 0029948 | 5/2000 |
| WO | WO 0079390 | 6/2000 |
| WO | WO0040038 | 7/2000 |
| WO | WO0130061 | 4/2001 |
| WO | WO0158110 | 8/2001 |
| WO | WO/03/033092 | 4/2003 |

OTHER PUBLICATIONS

Wang, Z. et al. "A Message Priority Assignment Algorithm for CAN-based Networks," in CSC '92 Proceedings of the 1992 ACM Annual Conference on Communications, Mar. 1992.

Fay-Wolfe, et al., "Real-Time CORBA," IEEE Transactions on Parallel and Distributed Systems, vol. 11, Issue 10 (Oct. 2000).

Husein et al., "A Priority Based Service Algorithm for Use in Time-Critical and Integrated Services Networks," Proceedings of IEEE Singapore International Conference, vol. 1, pp. 93-97, 1993.

Release 1 Specification Set from the Automotive Multimedia Interface Collaboration (AMI-C), Jan. 2001.

Open Services Gateway Initiative (OSGi) Service Gateway Specification Release 1.0, May 2000.

Ellis, S. M., "Dynamic Software Reconfiguration for Fault-Tolerant Real-Time Avionic Systems," Microprocessor and Microsystems, Proceedings of the 1996 Avionics Conference and Exhibition, vol. 21, issue 1, pp. 29-39, Jul. 1997.

Peter Walzer, and Hans-Wilhelm Grove, "Integrated Research Volkswagen (IRVW) Futura," Passenger Car Meeting and Exposition, Dearborn, Michigan, Sep. 17-20, 1990.

Nace, W. & Koopman, P., "A Product Family Based Approach to Graceful Degradation," Proceedings of DIPES 2000, International IFIP WG 10.3/WG 10.4/ WG 10.5 Workshop on, Distributed and Parallel Embedded Systems, Paderborn University, Germany, Oct. 18-19, 2000.

Meredith Beveridge, "M.S. Project Report, Jini on the Control Area Network (CAN): A Case Study in Portability Failure", Department of Electrical and Computer Engineering, Carnegie Mellon University, Phil Koopman—advisor, Mar. 2001.

Universal Serial Bus Specification, Revision 1.1, Compaq, Intel, Microsoft and NEC, Sep. 23, 1998.

Universal Serial Bus Specification, Revision 2.0, Compaq, Hewlett-Packard, Intel, Lucent, Microsoft, NEC and Philips, Apr. 27, 2000.

Tindell, Ken, et al, "A CAN Communications Concept with Guaranteed Message Latencies", Oct. 1998.

(56) References Cited

OTHER PUBLICATIONS

Robinson, Ralph L., "An Open Versus Closed Architecture for Multimedia Systems," Proceedings of the 2000 International Congress on Transportation Electronics, pp. 445-450, Oct. 2000.
Y. Chubachi and H. Okagaki , "The Development of Traffic Information System Using AutoPC," Proceedings of the 2000 International Congress on Transportation Electronics, pp. 81-88, Oct. 2000.
M. Tchorowski and J. Mate, "Avionics and Automotive bandwagon flying together on the infotronics Highway," Proceedings of the 1998 International Congress on Transportation Electronics, pp. 351-354, Oct. 1998.
Fout, Tom, "Universal Plug and Play in Windows XP," Jul. 1, 2001.
Yen, H.W., et al., "Information Security and Integrity in Network Vehicle," Proceedings of the 1998 International Congress on Transportation Electronics, pp. 319-323, Oct. 1998.
Minagawa, Shoichi, et al, "Open Architectural Car Multimedia Platform," Proceedings of the 1998 International Congress on Transportation Electronics, pp. 198-194 Oct. 1998.
Kanemitsu, Dean et al. "Productivitys Next Dimension—The Mobile Office Computing Platform," Proceedings of the 2000 International Congress on Transportation Electronics, pp. 159-165, Oct. 2000.
Bhaskaran, Parvathy, "Reinventing the Car Radio for the Internet-the iRadio™," Proceedings of the 2000, International Congress on Transportation Electronics, pp. 147-153, Oct. 2000.
Buckley, Stephen, et al., "The Car as a Peripheral-Adapting a Portable Computer to a Vehicle Intranet," Proceedings of the 1998 International Congress on Transportation Electronics, pp. 211-217, Oct. 1998.
Arnold, Ken, et al., "The Jini Specification," Publisher Addison-Wesley, 1999.
Powers, Chuck, et al., Today's Electronics in Todays Vehicles, Proceedings of the 1998 International Congress on Transportation Electronics, pp. 195-200, Oct. 1998.
Vaught, Mark A., "Phone-Activated Auto-Muting Circuit," Jan. 1990.
Clarion Co. Ltd., "Clarion AutoPC 310C Owner's Manual," 1998.
Clarion, "2002 Clarion Product Catalog Car Audio, Multimedia, Marine, and Security Retail Products," 2002.
Clarion Co., Ltd., "Joyride Quick Reference Guide," 2000-2001.
Joyride, Windows CE System Software User's Manual , 1999-2001.
Lind, R., et al., "The Network Vehicle—A Glimpse into the Future of Mobile Multi-Media," IEEE AES Systems Magazine, Sep. 1999.
Arun Ayyagari, Bluetooth ESDP for UPnP, Published Jan. 31, 2001.
First Amended Complaint and Answer from *Eagle Harbor Holdings, LLC, and Mediustech, LLC*, v. *Ford Motor Company*, Washington Western District Court, Case No. 3:11-CV-05503-BHS, Case filed: Jun. 30, 2011.
Exhibits and Modules from *Eagle Harbor Holdings, LLC, and Mediustech, LLC*, v. *Ford Motor Company*, Washington Western District Court, Case No. 3:11-CV-05503-BHS, Case filed: Jun. 30, 2011.
Longbin, Xiaoquain, Yizu Kang, Bar-Shalom: Unbiased converted measurements for tracking; IEEE Transactions on Aerospace and Electronic Systems vol. 34(4), Jul. 1998, pp. 1023-1027.
Miller, Drummond: Comparison of methodologies for mitigating coordinate transformation basis in target tracking; Proceedings SPIE Conference on Signal and Data Processing of Small Targets 2000, vol. 4048, Jul. 2002, pp. 414-426.
Duan, Han, Rong Li: Comments on "Unbiased (debiased) converted measurements for tracking" IEEE Transactions on Aerospace and Electronic Systems, vol. 40(4), Oct. 2004, pp. 1374-1377.
A. Das, R. Fierro, V. Kumar, J. Ostrowski, J. Spletzer, and C. Taylor, "A Framework for Vision Based Formation Control", IEEE Transactions on Robotics and Automation, vol. 18, Nov. 5, 2001, pp. 1-13.
Ada 95 Transition Support—Lessons Learned, Sections 3, 4, and 5, CACI, Inc.—Federal, Nov. 15, 1996, 14 pages.
AMIC. Architecture specification release 1, 2001; 35 pages.
Bluetooth Doc; Advance Audio Distribution Profile Specification; Adopted version 1.0; dated May 22, 2003; 75 pages.

Bluetooth Doc; Audio/Video Remote Control Profile; Version 1.0 Adopted; dated May 22, 2003; 52 pages.
Bluetooth Hands-free Profile 1.5 Nov. 25, 2005.
Bluetooth Specification version 1.1; Feb. 22, 2001; 452 pages.
Boeing News Release, "Boeing Demonstrates JSF Avionics Multi-Sensor Fusion", Seattle, WA, May 9, 2000, pp. 1-2.
Boeing Statement, "Chairman and CEO Phil Condit on the JSF Decision", Washington, D.C., Oct. 26, 2001, pp. 1-2.
Counterair: The Cutting Edge, Ch. 2 "The Evolutionary Trajectory the Fighter Pilot-Here to Stay?" AF2025 v3c8-2, Dec. 1996, pp. 1-7.
Counterair: The Cutting Edge, Ch. 4 "The Virtual Trajectory Air Superiority without an "Air" Force?" AF2025 v3c8-4, Dec. 1996, pp. 1-12.
Embedded Bluetooth Migrates to Lisbon and Seattle; 11 pages; Jan. 23, 2008.
Green Hills Software, Inc., "The AdaMULTI 2000 Integrated Development Environment," Copyright 2002, printed Jul. 9, 2002; 7 pages.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, 2001, pp. 1-6.
Hitachi Automated Highway System (AHS), Automotive Products, Hitachi, Ltd., Copyright 1994-2002, 8 pages.
IEEE Standard for Information Technology—POSIX Based Supercomputing Application Environment Profile; Jun. 14, 1995, 72 pages.
ISIS Project: Sensor Fusion, Linkoping University Division of Automatic Control and Communication Systems in cooperation with SAAB (Dynamics and Aircraft), 2001, 18 pages.
J. Takezaki, N. Ueki, T. Minowa, H. Kondoh, "Support System for Safe Driving—A Step Toward ITS Autonomous Driving—", Hitachi Review, vol. 49, Nov. 3, 2000, pp. 1-8.
Joint Strike Fighter Terrain Database, ets-news.com "Simulator Solutions" 2002, 3 pages.
Luttge, Karsten; "E-Charging API: Outsource Charging to a Payment Service Provider"; IEEE; 2001 (pp. 216-222).
M. Chantler, G. Russel, and R. Dunbar, "Probabilistic Sensor Fusion for Reliable Workspace Sensing", Fourth IARP workshop on Underwater Robotics, Genoa, Nov. 1992, pp. 1-14.
MSRC Redacted Proposal, 3.0 Architecture Development, Aug. 29, 2002; pp. 1-43.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Product description of Raytheon Electronic Systems (ES), Copyright 2002, pp. 1-2.
Product description of Raytheon RT Secure, "Development Environment", Copyright 2001, pp. 1-2.
Product description of Raytheon RT Secure, "Embedded Hard Real-Time Secure Operating System", Copyright 2000, pp. 1-2.
S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.
Specification of the Bluetooth System v1.0.B; Dec. 1, 1999.
Specification of the Bluetooth System v1.1; Feb. 22, 2001.
TNO FEL Annual Review 1998: Quality works, Observation Systems Division; "The Whole is More Than the Sum of its Parts"; 16 pages.
Vehicle Dynamics Lab, University of California, Berkeley, funded by BMW, current members: D. Caveney and B. Feldman, "Adaptive Cruise Control", at least as early as 2002, printed Jul. 2, 2002; 17 pages.
Stirling A: "Mobile Multimedia platforms" Vehicular Technology Conference Fall 2000. IEEE VTS Fall VTC2000. 52nd Vehicular Technology Conference (Cat. No. 00CH37152).
Nusser R. et al.: "Bluetooth-based wireless connectivity in an automotive environment" Vehicular Technology Conference Fall 2000. IEEE VTS Fall VTC2000 52nd Vehicular Techonlogy Conference (Cat. No. 00CH37152).

(56) References Cited

OTHER PUBLICATIONS

Martins e f v et al. "design of an OS9 operating system extension for a message-passing multiprocesor" Microprocessors and Microsystems, IPC Business Press LT. London, BG, vol. 21, No. 9, Apr. 1, 1998, pp. 533-543.

Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.

International Search Report for PCT/US02/020402; Mailing date Apr. 3, 2003.

International Search Report for PCT/US02/020403; Mailing date Jan. 27, 2003.

International Search Report for PCT/US02/016364; Mailing date Feb. 14, 2003.

International Search Report for PCT/US02/016371; Mailing date Aug. 18, 2003.

\* cited by examiner

METHOD AND APPARATUS FOR A TASK PRIORITY PROCESSING SYSTEM

RELATED FILINGS

This application is a Continuation of patent application Ser. No. 12/483,214 filed Jun. 11, 2009 Titled—METHOD AND APPARATUS FOR DYNAMIC CONFIGURATION OF MULTIPROCESSOR SYSTEM, which is a continuation of U.S. Pat. No. 7,778,739 Issued Jul. 28, 2010 Titled—METHOD AND APPARATUS FOR DYNAMIC CONFIGURATION OF MULTIPROCESSOR SYSTEM, which is a continuation of U.S. Pat. No. 7,146,260 Issued Dec. 5, 2006 Titled—METHOD AND APPARATUS FOR DYNAMIC CONFIGURATION OF MULTIPROCESSOR SYSTEM and this application incorporates by reference U.S. Pat. No. 6,629,033, Issued Sep. 30, 2003 Titled—OPEN COMMUNICATION SYSTEM FOR REAL-TIME MULTI-PROCESSOR APPLICATIONS.

REFERENCES CITED

U.S. Patent Documents

U.S. Pat. No. 4,829,434 May 1989; Karmel et al.
U.S. Pat. No. 5,581,462 December 1996; Rogers
U.S. Pat. No. 5,786,998 July 1998; Neeson et al.
U.S. Pat. No. 6,161,071 December 2000; Shuman et al.
U.S. Pat. No. 6,181,994 January 2001; Colson et al.
U.S. Pat. No. 6,182,006 January 2001; Meek
U.S. Pat. No. 6,243,450 June 2001; Jansen et al.
U.S. Pat. No. 6,505,100 January 2003; Stuempfle et al.
U.S. Pat. No. 6,622,083 September 2003; Knockeart et al.

Foreign Patent Documents

WO96/24229 August, 1996 WO
WO99/08436 February, 1999 WO
WO99/57662 November, 1999 WO
WO99/65183 December, 1999 WO
WO01/30061 April, 2001 WO
WO01/58110 August, 2001 WO

Other References

Product description of Raytheon RT Secure, "Embedded Hard Real-Time Secure Operating System", Copyright 2000, pp. 1-2. cited by other.

Product description of Raytheon RT Secure, Copyright 2001, pp. 1-2. cited by other.

Product description of Raytheon RT Secure, "Development Environment", Copyright 2001, pp. 1-2. cited by other.

Product description of Raytheon Electronic Systems (ES), Copyright 2002, pp. 1-2. cited by other.

H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6. cited by other.

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13. cited by other.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1-8. cited by other.

S. G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, N.C., 1997, pp. 1-5. cited by other.

M. Chantler, G. Russel, and R. Dunbar, "Probabilistic Sensor Fusion for Reliable Workspace Sensing", pp. 1-14. cited by other.

ISIS Project: Sensor Fusion, Linkoping University Division of Automatic Control and Communication Systems in cooperation with SAAB (Dynamics and Aircraft), 18 pages. cited by other.

Hitachi Automated Highway System (AHS), Automotive Products, Hitachi, Ltd., Copyright 1994-2002, 8 pages. cited by other.

Vehicle Dynamics Lab, University of California, Berkeley, funded by BMW, current members: D. Caveney and B. Feldman, "Adaptive Cruise Control", 17 pages. cited by other.

Counterair: The Cutting Edge, Ch. 2 "The Evolutionary Trajectory The Fighter Pilot-Here to Stay?" AF2025 v3c8-2, December 1996, pp. 1-7. cited by other.

Counterair: The Cutting Edge, Ch. 4 "The Virtual Trajectory Air Superiority without an "Air" Force?" AF2025 v3c8-4, December 1996, pp. 1-12. cited by other.

TNO FEL Annual Review 1998: Quality works, 16 pages. cited by other.

Boeing News Release, "Boeing Demonstrates JSF Avionics Multi-Sensor Fusion", Seattle, Wash., May 9, 2000, pp. 1-2. cited by other.

Boeing Statement, "Chairman and CEO Phil Condit on the JSF Decision", Washington, D.C., Oct. 26, 2001, pp. 1-2. cited by other.

Ada 95 Transition Support—Lessons Learned, Sections 3, 4, and 5, CACI, Inc.-Federal, Nov. 15, 1996, 14 pages. cited by other.

Joint Strike Fighter Terrain Databaste, ets-news.com "Simulator Solutions" 2002, 3 pages. cited by other.

MSRC Redacted Proposal, 3.0 Architecture Development, pp. 1-43. cited by other.

Powerpoint Presentation by Robert Allen—Boeing Phantom Works entitled "Real-Time Embedded Avionics System Security and COTS Operating Systems", Open Group Real-Time Forum, Jul. 18, 2001, 16 pages. cited by other.

Green Hills Software, Inc., "The AdaMULTI 2000 Integrated Development Environment", Copyright 2002, 7 pages. cited by other.

Luttge, Karsten: "E-Charging API: Outsource Charging to a Payment Service Provider"; IEEE; 2001 (pp. 216-222). cited by other.

BACKGROUND

Cars include many different electromechanical and electronic applications. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems operate independently and do not talk to the other car systems. For example, separate processors and separate user interfaces are required for the car temperature control system and for the car audio system. Many of these different car processors may be underutilized since they are only used intermittently.

Even when multiple processors in the car do talk to each other, they are usually so tightly coupled together that it is impossible to change any one of these processors without disrupting all of the systems that are linked together. For example, some cars may have a dashboard interface that controls both internal car temperature and a car radio. The car radio cannot be replaced with a different model and still work with the dashboard interface and the car temperature controller.

Integration of new systems into a car is also limited. Car systems are designed and selected well before the car is ever built. A custom wiring harness is then designed to connect only those car systems selected for the car. A car owner cannot incorporate new systems into the existing car. For example, a car may not originally come with a navigation system. An after market navigation system from another manufacturer cannot be integrated into the existing car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer not from the front dashboard of the car, but from the passenger seat of the car. This makes many after market devices both difficult and dangerous to operate while driving.

Cars include many different electro-mechanical and electronic systems. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems has to provide a separate standalone operating system. For example, separate processors and separate user interfaces are required for the car temperature control system and for the car audio system. Many of these different car processors may be underutilized since they are only used intermittently.

Even when some processors in the car do talk to each other, they are usually so tightly coupled together that it is impossible to change any one of these processors without disrupting all of the systems that are linked together. For example, some cars may have an interface on the dashboard that controls both internal car temperature and a car radio. The car radio cannot be replaced with a different model and still work with the dashboard interface and the car temperature controller. Integration of new systems into a car is also limited. Car systems are designed and selected well before the car is ever built. A custom wiring harness is then designed to connect all the car systems selected for the car. A car owner can not later incorporate new systems into the existing car. For example, a car may not originally come with a car navigation system. An after market navigation system from another manufacturer cannot be integrated into the car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer, not from the front dashboard of the car, but from the passenger seat of the car. This makes many after market devices both difficult and dangerous to operate while driving.

The present invention addresses this and other problems associated with the prior art.

The present invention addresses this and other problems associated with the prior art.

SUMMARY OF THE INVENTION

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

A communication system for a mobile vehicle, home, or office environment includes multiple processors. The multiple processors each run an Open Communication system that controls how data is transferred between processors based on data content as opposed to the links that connect the processors together. The open communication system enables data or messages to be effectively transferred and processed for real-time applications or other server based applications that may be running on the multiple processors in a secure environment regardless of processors, locations, or data links.

DETAILED DESCRIPTION

Figure 1:
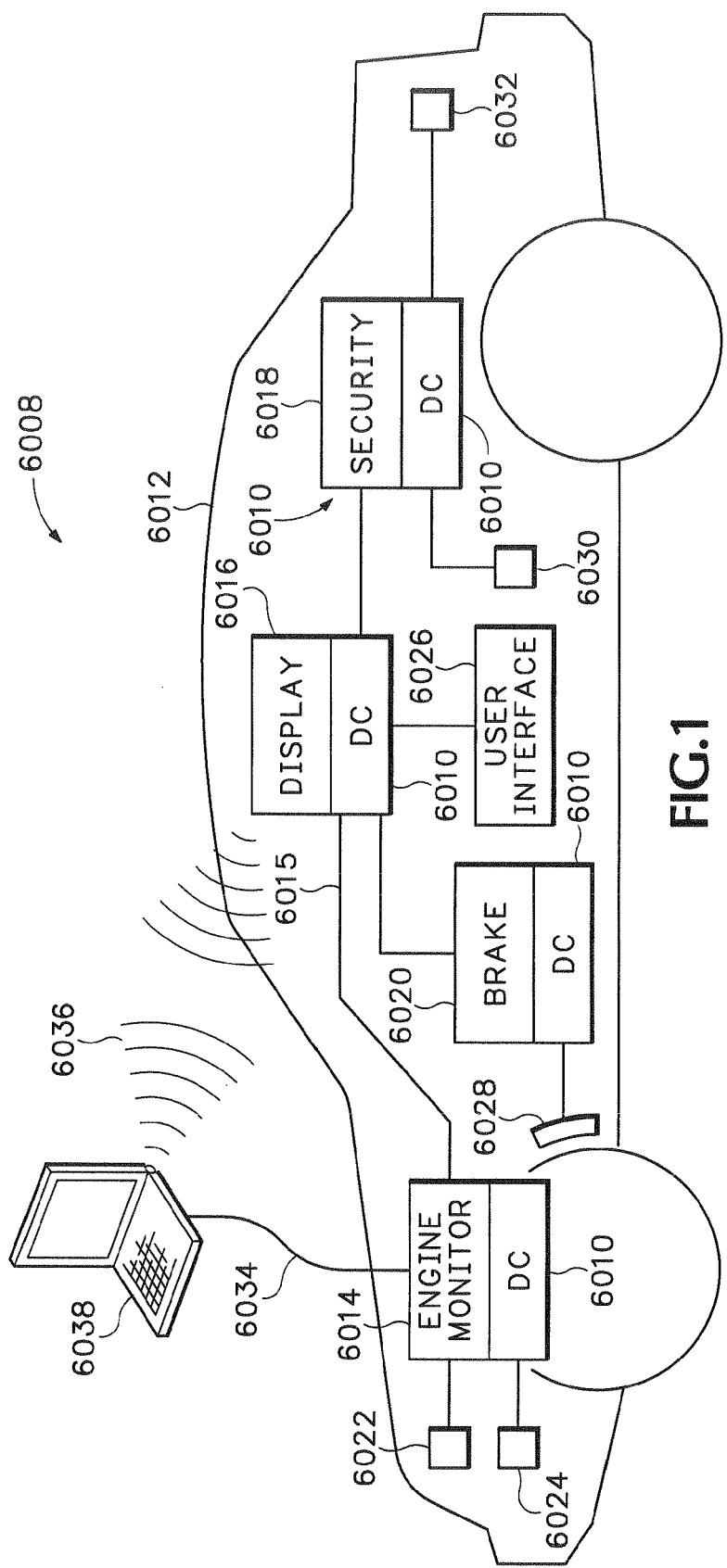
FIG. 1 is a diagram of a car that has multiple processors that each run a Dynamic Configuration (DC) system.

FIG. 1 shows a car 6012 that includes a car multiprocessor system 6008 having multiple processors 6014, 6016, 6018 and 6020. An engine monitor processor 6014 monitors data from different sensors 6022 and 6024 in the car engine. The sensors 6022 and 6024 can be any sensing device such as sensors that monitor water temperature, oil temperature, fuel consumption, car speed, etc. A brake control processor 6020 monitors and controls an Automatic Braking System (ABS) 6028. A display processor 6016 is used to control and monitor a graphical user interface 6026. A security processor 6018 monitors and controls latches and sensors 6030 and 6032 that are used in a car security system.

The processors 6014, 6016, 6018 and 6020 all include software that run a Dynamic Configuration (DC) system 6010 that enables new processors or devices to be automatically added and removed from the car multiprocessor system 6008. The DC system 6010 also automatically reconfigures the applications running on different processors according to application failures and other system processing requirements.

For example, the processor 6020 may currently be running a high priority brake control application. If the processor 6020 fails, the DC system 6010 can automatically download the braking application to another processor in car 6012. The DC system 6010 automatically identifies another processor with capacity to run the braking control application currently running in processor 6020. The DC system 6010 then automatically downloads a copy of the braking control application to the identified processor. If there is no extra reserve processing resources available, the DC system 6010 may replace a non-critical application running on another processor. For example, the DC system 6010 may cause the display processor 6016 to terminate a current non-critical application and then download the brake control application along with any stored critical data.

The DC system 6010 also automatically incorporates new processors or applications into the multiprocessor system 6008. For example, a laptop computer 6038 can communicate with the engine monitor processor 6034 through a hardwired link 6034 or communicate to the display processor 6016 through a wireless link 6036. The DC system 6010 automatically integrates the laptop computer 6038, or any other processor or device, into the multiprocessor system 6008. After integrated into the multiprocessor system 6008, not only can the laptop computer 6038 transfer data with other processors, but the laptop computer may also run car applications normally run by other processors in car 6012.

The DC system 6010 allows the car driver to manage how different applications are processed in the car 6012. As described above, a car operator may have to run an aftermarket navigation system through a GPS transceiver attached to the laptop computer 6038. The car driver has to place the laptop computer 6038 in the passenger's seat and then operate the laptop computer 6038 while driving.

The DC system 6010 in the display computer 6016 can automatically detect the navigation application running on the laptop computer 6038. The display computer 6016 notifies the car operator through the user interface 6026 that the navigation application has been detected. The car operator can then control the navigation application through the user interface 6026. Since the user interface 6026 is located in the dashboard of car 6012, the car operator no longer has to take his eyes off the road while operating the navigation application.

The description below gives only a few examples of the different processors, devices and applications that can be implemented using the DC system 6010. Any single or multiprocessor system located either inside or outside of car 6012 can communicate and exchange data using the OC system 6010. It should also be understood that the DC system 6010 can be used in any real-time environment such as between processors in different home or office appliances and different home and office computers.

Figure 2:
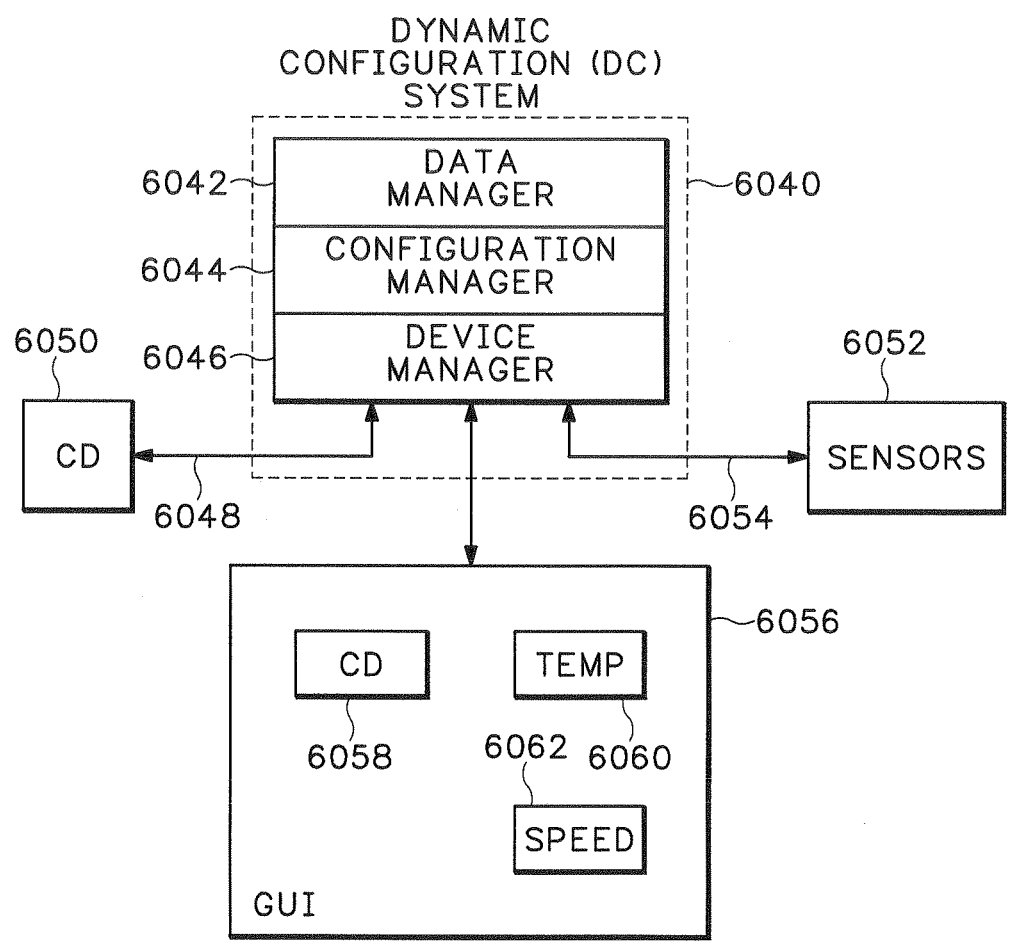
FIG. 2 is a detailed diagram of the dynamic configuration system shown in FIG. 1.

FIG. 2 is a block diagram showing in more detail the Dynamic Control (DC) system 6010 located in a processor 6040 that makes up part of the multiprocessor system 6008 in car 6012 (FIG. 1). The DC system 6010 includes a device manager 6046 that establishes communications with new devices that are to be incorporated into the multiprocessor system 6008. A configuration manager 6044 in the processor 6040 dynamically moves applications between different processors according to user inputs and other monitored conditions in the multiprocessor system 6008. A data manager 6042 identifies a type of data input or output by a new processor and identifies other processors or devices in the multiprocessor system that can output data from the new device or input data to the new device.

In one example, sensors 6052 feed sensor data to processor 6040. The sensor data may include engine-monitoring data such as speed, oil temperature, water temperature, temperature inside the car cab, door open/shut conditions, etc. The sensors 6052 are coupled to processor 6040 through a link 6054, such as a proprietary bus. A Compact Disc (CD) player 6050 is coupled to the processor 6040 through another link 6048, such as a Universal Serial Bus (USB). Graphical User Interface (GUI) 6056 displays the data associated with sensors 6052 and CD player 6050. The GUI 6056 displays the outputs from sensors 6052 using an icon 6060 to identify temperature data and an icon 6062 to identify car speed. The processor displays the CD player 6050 as icon 6062.

Figure 3:
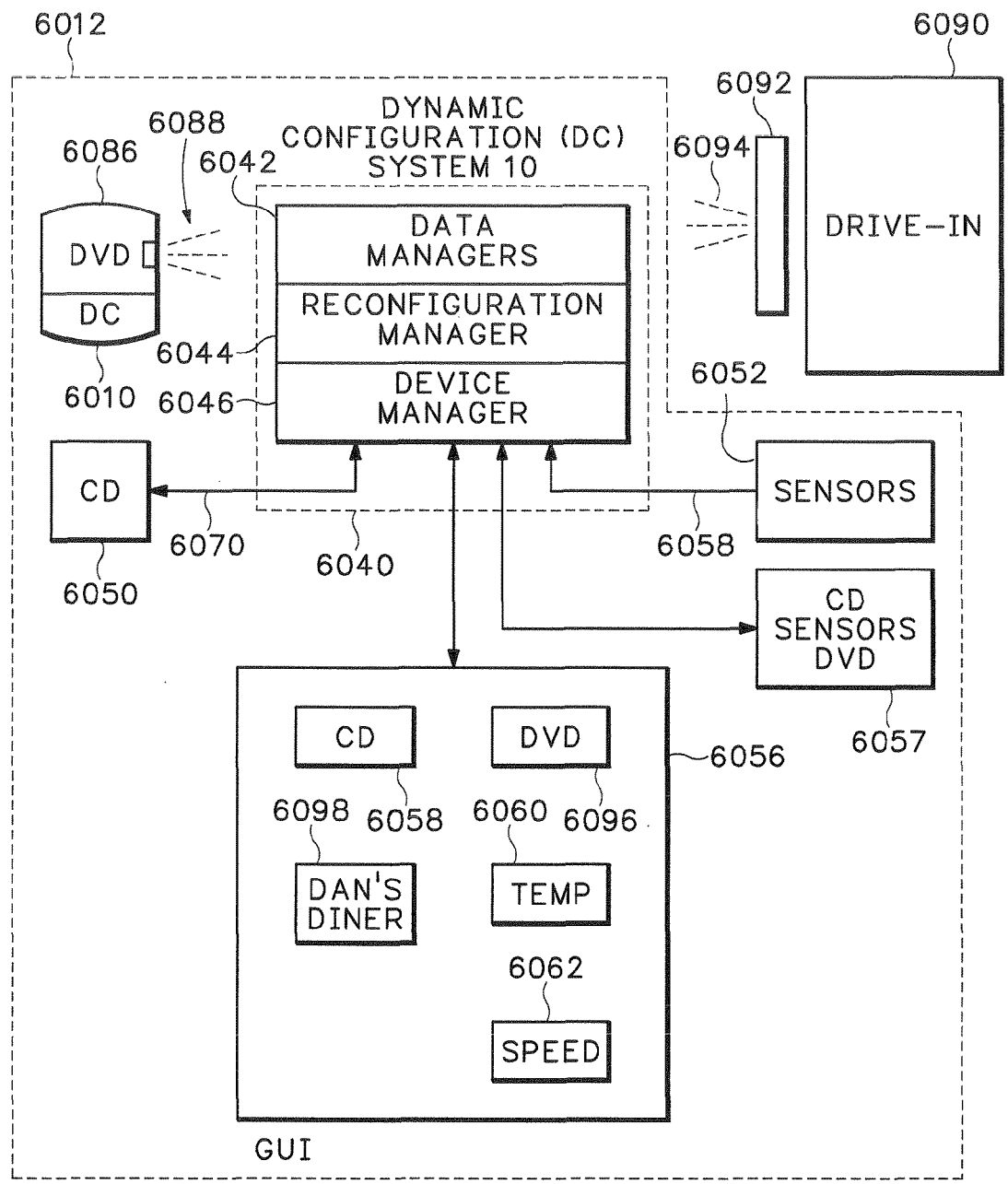
FIGS. 3 and 4 are diagrams showing an example of how the DC system operates.
Figure 4:
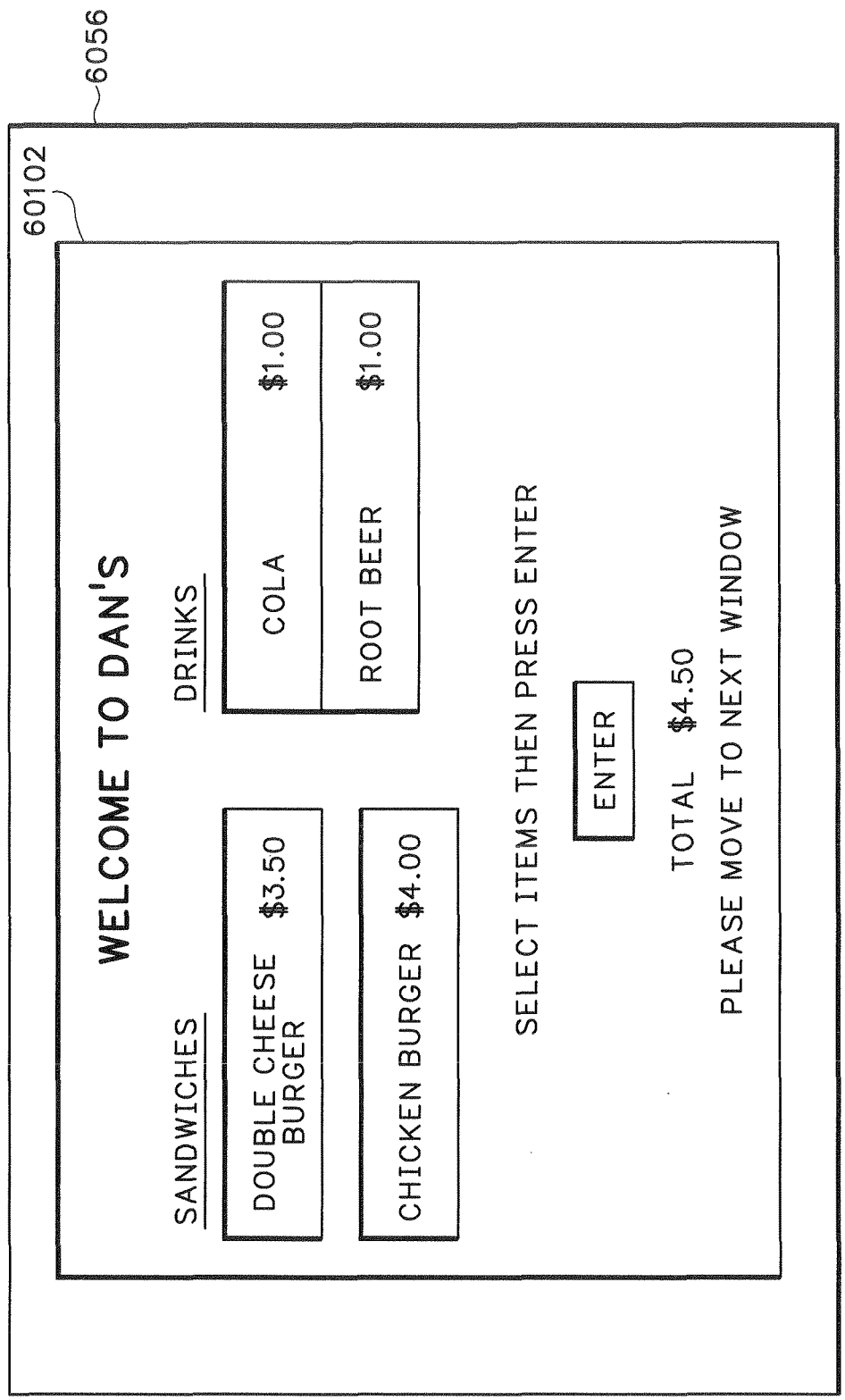

FIGS. 3 and 4 show an example of how two new applications are dynamically added to the multiprocessor system 6008 in car 6012 (FIG. 1). In FIG. 2, the DC system 6010 in processor 6040 previously detected a CD player 6050 and some sensors 6056. The CD player 6050 was displayed on GUI 6056 as icon 6058 and the temperature and speed data from sensors 6056 were displayed on GUI 6056 as icons 6060 and 6062, respectfully.

The processor 6040 is located in car 6012 (FIG. 1). A passenger may bring a Digital Video Disc (DVD) player 6086 into the car 6012. The DVD 6086 sends out a wireless or wired signal 60088 to the processor 6040. For example, the DVD 6086 may send out signals using a IEEE 802.11 wireless protocol. The processor 6040 includes an IEEE 802.11 interface that reads the signals 60088 from DVD player 6086. If the 802.11 protocol is identified as one of the protocols used by processor 6040, the DC system 6010 incorporates the DVD player 6086 into a processor array 6057 that lists different recognized applications.

The DC system 6010 then automatically displays the newly detected DVD player 6086 on GUI 6056 as icon 6096. If capable, the car operator by selecting the icon 6096 can then display a video stream output from the DVD player 6086 over GUI 6056. The DVD player 6086 can now be controlled from the GUI 6056 on the car dashboard. This prevents the car driver from having to divert his eyes from the road while trying to operate the portable DVD player 6086 from another location in the car, such as from the passenger seat.

Other processors or devices can also be incorporated into the multiprocessor system 6008 in car 6012. In another example, the car 6012 drives up to a drive-in restaurant 6090. The drive-in 6090 includes a transmitter 6092 that sends out a wireless Blue tooth signal 6094. The processor 6040 includes a Blue tooth transceiver that allows communication with transmitter 6092. The DC system 6010 recognizes the signals 6094 from transmitter 6092 and then incorporates the drive-in 6090 into the multiprocessor system 6008 (FIG. 1). The DC system 6010 then displays the drive-in 6090 as icon 6098 in GUI 6056.

Referring to FIG. 4, when the car operator selects the icon 6098, a menu 60102 for the driver-in 6090 is displayed on the GUI 6056. The car operator can then select any of the items displayed on the electronic menu 60102. The selections made by the car operator are sent back to the transceiver 6092 (FIG. 3). The amount of the order is calculated and sent back to the processor 6040 and displayed on menu 60102. Other messages, such as a direction for the car operator to move to the next window and pickup the order can also be displayed on the GUI 6056. At the same time, the drive-in transceiver 6092 (FIG. 3) may send audio signals that are received by the processor 6040 and played out over speakers in car 6012.

Figure 5:
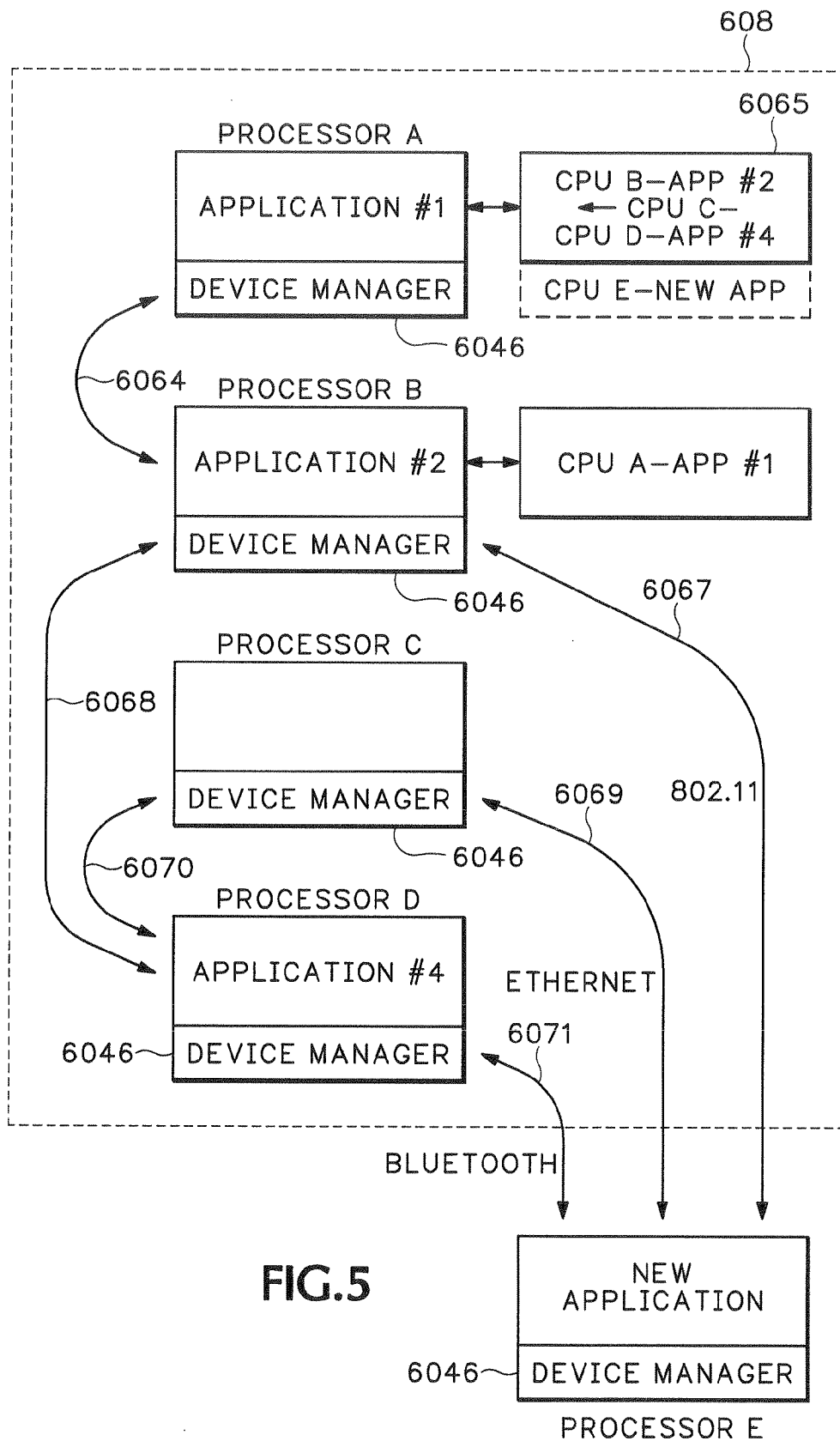
FIGS. 5 and 6 are diagrams showing how a device manager in the DC system operates.

FIG. 5 shows in more detail the operation of the device manager 6046 previously shown in FIG. 2. Multiple processors A, B, C and D all include device managers 6046. The device managers 6046 can each identify other devices in the multiprocessor system that it communicates with. For example, processors A, B, C and D communicate to each other over one or more communication links including a Ethernet link 6064, a wireless 802.11 link 6068, or a blue tooth link 6070.

Processor A includes a memory 6065 that stores the other recognized processors B, C and D. The data managers 6046 also identify any applications that may be running on the identified processors. For example, memory 6065 for processor A identifies an application #2 running on processor B, no applications running on processor C, and an application #4 running on processor D.

Figure 6:
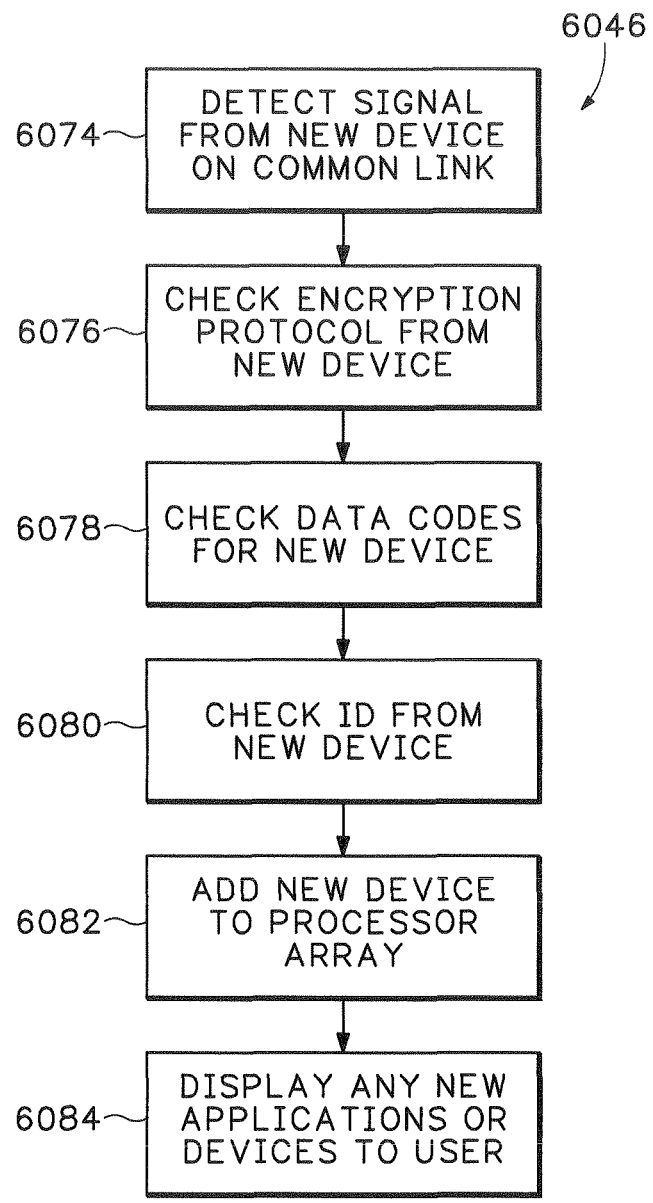

FIGS. 5 and 6 show how a new device is added to the multiprocessor system 6008. Each of the existing processors A, B, C, and D after power-up are configured to identify a set or subset of the processors in the multiprocessor system 6008. A new device 6072 is brought into the multiprocessor system 6008 either via a hardwired link or a wireless link. For example, the device E may send out signals over any one or more of a 802.11 wireless link 6067, Blue tooth wireless link 71 or send out signals over a hardwired Ethernet link 6069. Depending on what communication protocol is used to send signals, one or more of the processors A, B, C or D using a similar communication protocol detect the processor E in block 6074 (FIG. 6). All of the processors may be connected to the same fiber optic or packet switched network that is then used to communicate the information from processor E to the other processors.

One of the device managers 6046 in the multiprocessor system 6008 checks the signals from processor E checks to determine if the signals are encrypted in a recognizable protocol in block 6076. The device manager in the processor receiving the signals from processor E then checks for any data codes from the new device signals in block 6076. The data codes identify data types used in one or more applications by processor E. A device ID for processor E is then determined from the output signals in block 6080.

If all these data parameters are verified, the device managers 6046 in one or more of the processors A, B, C and D add the new processor E to their processor arrays in block 6082. For example, processor A adds processor E to the processor array in memory 6065. After being incorporated into the multiprocessor system 6008, the processor E or the applications running on the processor E may be displayed on a graphical user interface in block 6084.

Figure 7:
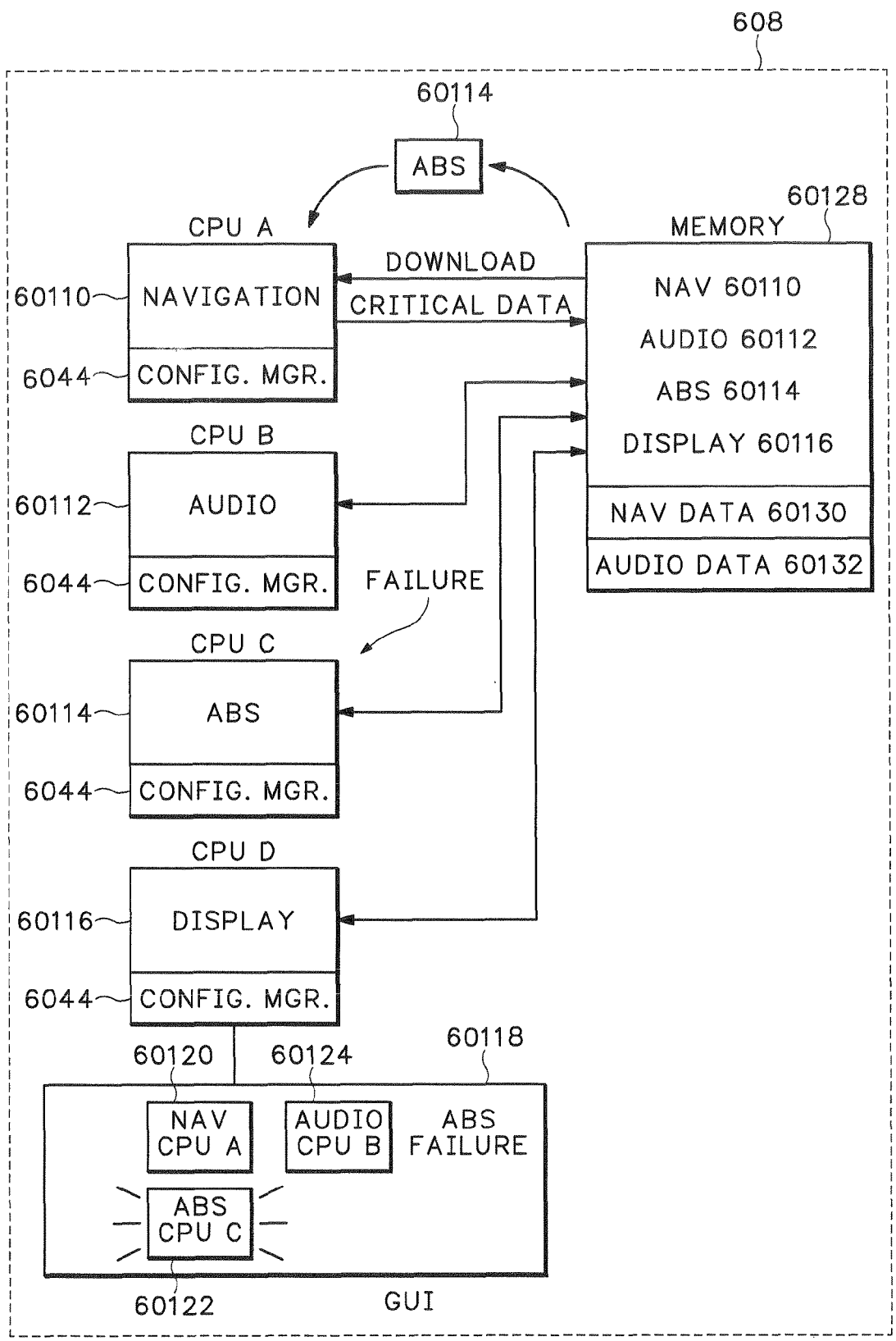
FIGS. 7-10 are diagrams showing how a reconfiguration manager in the DC system operates.

FIG. 7 describes in further detail the operation of the reconfiguration manager 6044 previously described in FIG. 2. In the car multiprocessor system 8 there are four processors A, B, C and D. Of course there may be more than four processors running at the same time in the car but only four are shown in FIG. 7 for illustrative purposes. The processor A currently is operating a navigation application 60110 that uses a Global Positioning System (GPS) to identify car location. Processor B currently runs an audio application 60112 that controls a car radio and CD player. The processor C runs a car Automatic Braking System (ABS) application 60114 and the processor D runs a display application 60116 that outputs information to the car operator through a GUI 60118.

The processor D displays an icon 60120 on GUI 60118 that represents the navigation system 60110 running in processor A. An icon 60124 represents the audio application running in processor B and an icon 60122 represents the ABS application 60114 running in processor C.

The memory 60128 stores copies of the navigation application 60110, audio application 60112, ABS application 60114 and display application 60116. The memory 60128 can also store data associated with the different applications. For example, navigation data 60130 and audio data 60132 are also stored in memory 60128. The navigation data 60130 may consist of the last several minutes of tracking data obtained by the navigation application 60110. The audio data 60132 may include the latest audio tracks played by the audio application 60112.

The memory 60128 can be any CD, hard disk, Read Only Memory (ROM), Dynamic Random Access (RAM) memory, etc. or any combination of different memory devices. The memory 60128 can include a central memory that all or some of the processors can access and may also include different local memories that are accessed locally by specific processors.

Figure 8:
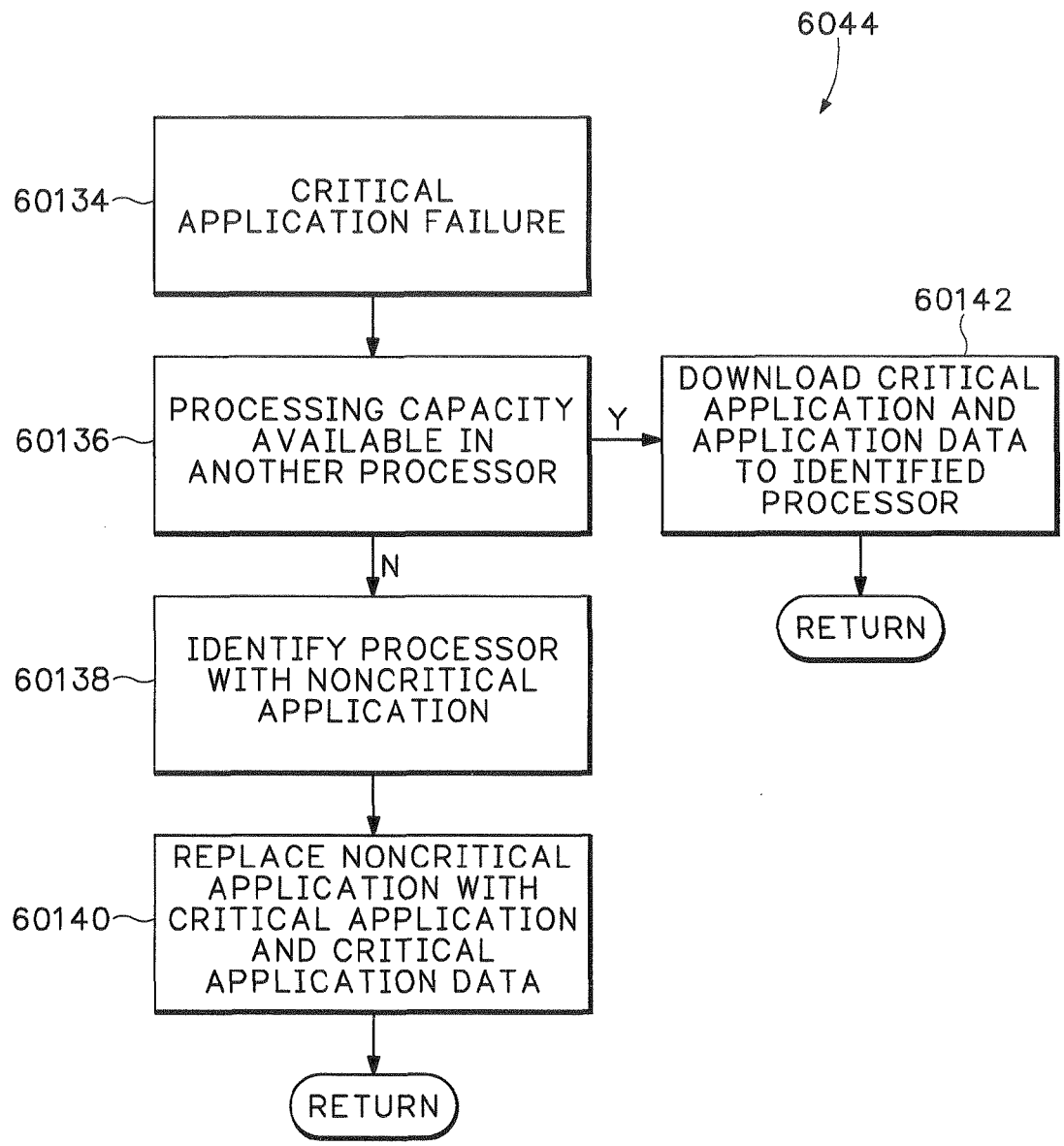

FIG. 8 shows one example of how the configuration manager 6044 reconfigures the multiprocessor system when a failure occurs in a critical application, such as a failure of the ABS application 60114. The configuration manager 6044 for one of the processors in the multiprocessor system 6008 detects a critical application failure in block 60134.

One or more of the configuration managers 6044 include a watchdog function that both monitors its own applications and the applications running on other processors. If an internal application fails, the configuration manager may store critical data for the failed application. The data for each application if stored in the memory 60128 can selectively be encrypted so that only the car operator has the authority to download certain types of data. The configuration manager detecting the failure initiates a reboot operation for that particular application. The application is downloaded again from memory 60128 and, if applicable, any stored application data. If the application continues to lockup, the configuration manager may then initiate a reconfiguration sequence that moves the application to another processor.

Failures are identified by the watchdog functions in one example by periodically sending out heartbeat signals to the other processors. If the heartbeat from one of the processors is not detected for one of the processors, the configuration manager 6044 for the processor that monitors that heartbeat attempts to communicate with the processor or application. If the application or processor with no heartbeat does not respond, the reconfiguration process is initiated.

In another example, certain processors may monitor different applications. For example, a sensor processor may constantly monitor the car speed when the car operator presses the brake pedal. If the car speed does not slow down when the brake is applied, the sensor processor may check for a failure in either the braking application or the speed sensing application. If a failure is detected, the configuration manager initiates the reconfiguration routine.

When reconfiguration is required, one of the reconfiguration managers 6044 first tries to identify a processor that has extra processing capacity to run the failed application in block 60136. For example, there may be a backup processor in the multiprocessor system where the ABS application 60114 can be downloaded. If extra processing resources are available, the ABS application 60114 is downloaded from the memory 60128 (FIG. 7) to the backup processor in block 60142.

There may also be data associated with the failed application that is stored in memory 60128. For example, the brake commands for the ABS application 60114 may have been previously identified for logging in memory 60128 using a logging label described in co-pending application entitled: OPEN COMMUNICATION SYSTEM FOR REAL-TIME MULTIPROCESSOR APPLICATIONS, Ser. No. 09/841,753 filed Apr. 24, 2001 which is herein incorporated by reference. The logged brake commands are downloaded to the backup processor in block 60142.

If no backup processing resources can be identified in block 60136, the configuration manager 6044 identifies one of the processors in the multiprocessor system that is running a non-critical application. For example, the configuration manager 6044 may identify the navigation application 60110 in processor A as a non-critical application. The configuration manager 6044 in block 60140 automatically replaces the non-critical navigation application 60110 in processor A with the critical ABS application 60114 in memory 60128. The processor A then starts running the ABS application 60114.

Figure 9:
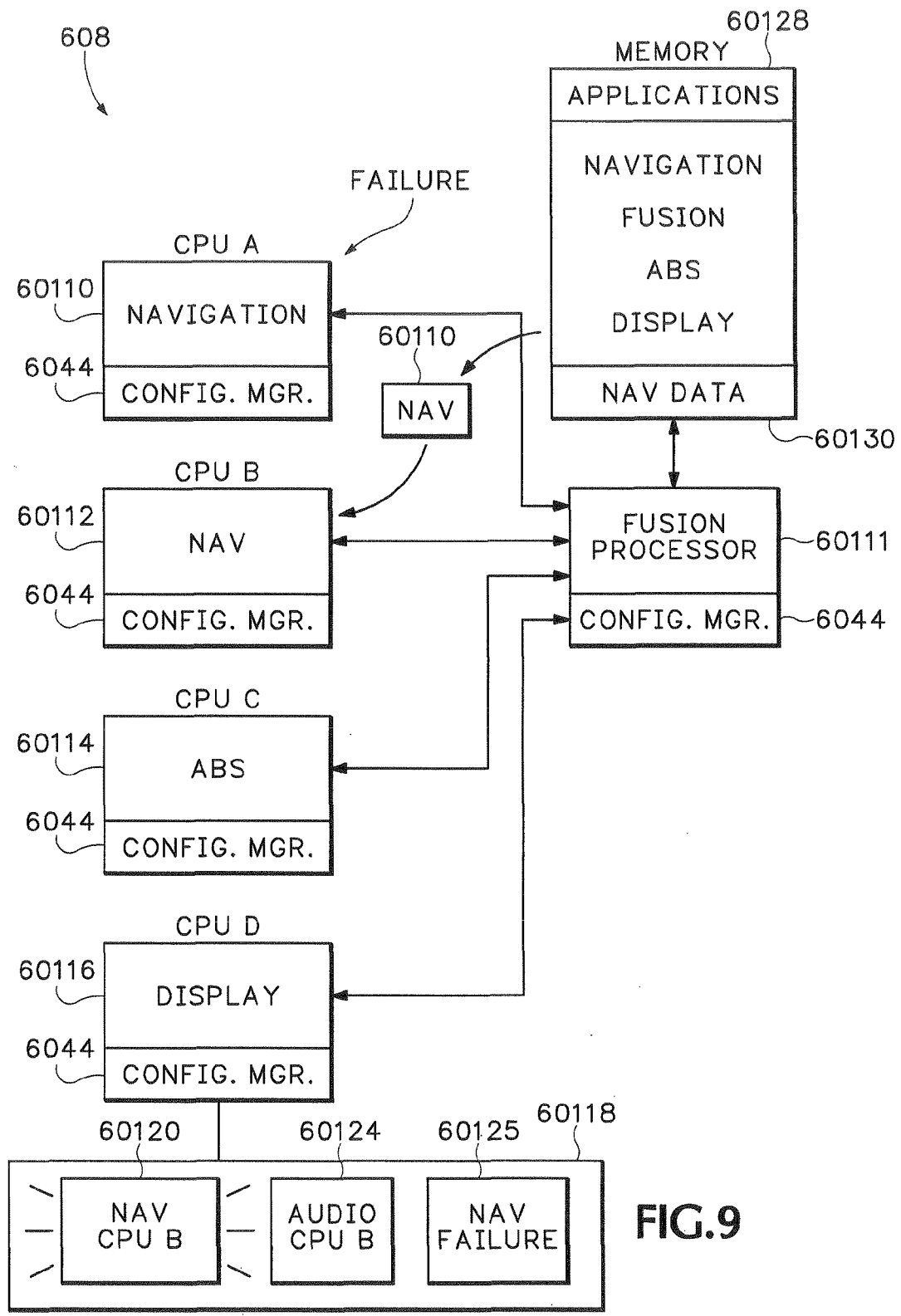
Figure 10:
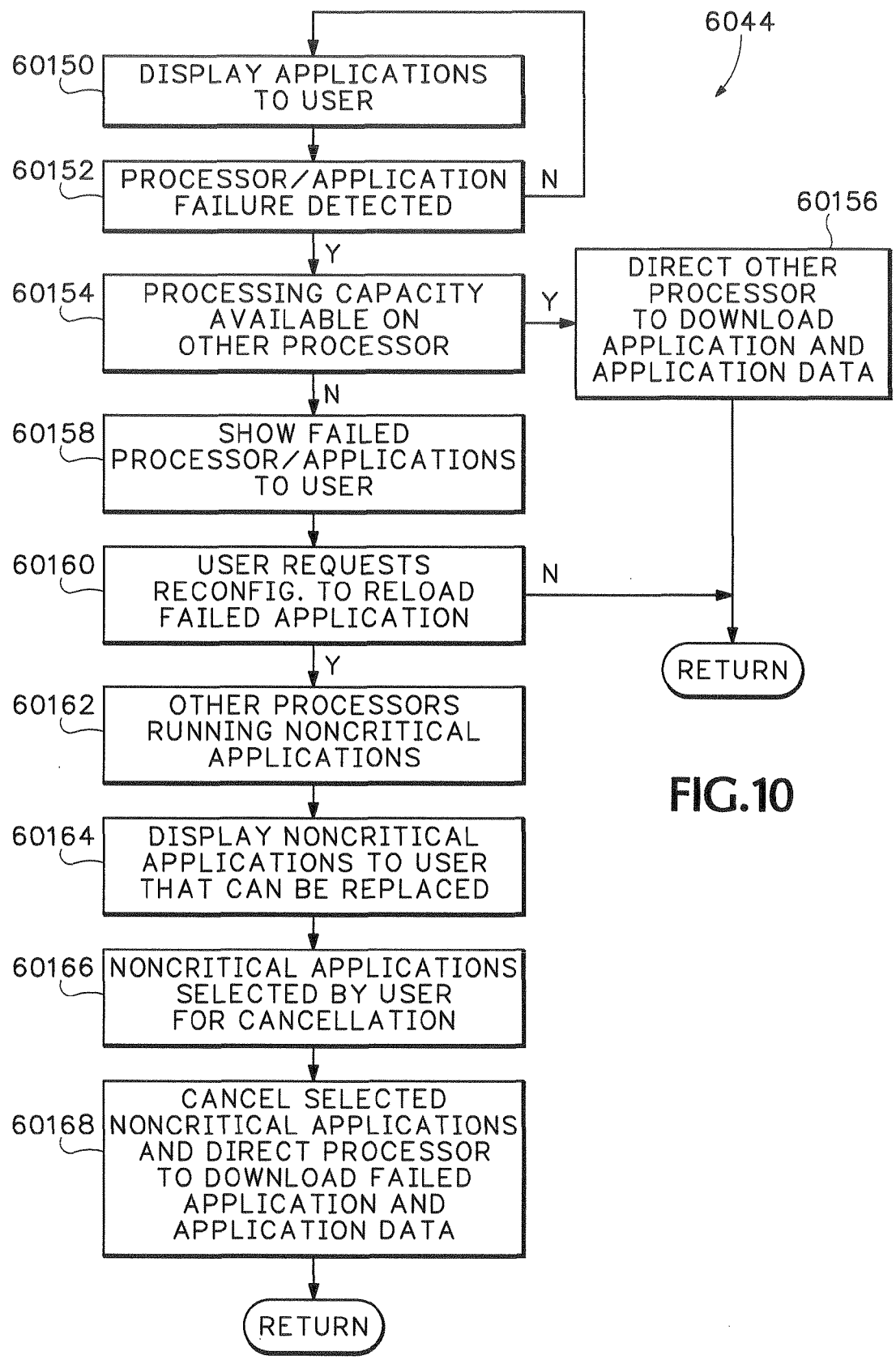

FIGS. 9 and 10 show an example of how the configuration manager 6044 allows the user to control reconfiguration for non-critical applications. The applications currently running in the multiprocessor system 6008 are displayed in the GUI 60118 in block 60150. A failure is detected for the navigation application 60110 running in processor A in block 60152. The configuration manager 6044 in processor A, or in one of the other processors B, C, or D detects the navigation failure. Alternatively, a fusion processor 60111 is coupled to some or all of the processors A, B, C and D and detects the navigation failure.

In block 60154 the configuration manager 6044 for one of the processors determines if there is extra capacity in one of the other processors for running the failed navigation application 60110. If there is another processor with extra processing capacity, the navigation application is downloaded from memory 60128 to that processor with extra capacity along with any necessary navigation data in block 60156. This reconfiguration may be done automatically without any interaction with the car operator.

If there is no extra processing capacity for running the navigation application 60110, the configuration manager 6044 displays the failed processor or application to the user in block 60158. For example, the GUI 60118 in FIG. 9 starts blinking the navigation icon 60120 in possibly a different color than the audio application icon 60124. A textual failure message 60125 can also be displayed on GUI 60118.

The configuration manager in block 60160 waits for the car operator to request reconfiguration of the failed navigation application to another processor. If there is no user request, the configuration managers return to monitoring for other failures. If the user requests reconfiguration, the configuration manager 6044 in block 60164 displays other non-critical applications to the user. For example, the GUI 60118 only displays the audio application icon 60124 in processor B and not the ABS application icon 60122 (FIG. 7). This is because the audio application is a non-critical application and the ABS application 60114 is a critical application that cannot be cancelled.

If the car operator selects the audio icon 60124 in block 60166, the configuration manager in block 60168 cancels the audio application 60112 in processor B and downloads the navigation application 60110 from memory 60128 into processor B. A logging manager in processor A may have labeled certain navigation data for logging. That navigation data 60130 may include the last few minutes of position data for the car while the navigation application 60110 was running in processor A. The logged navigation data 60130 is downloaded from memory 60128 along with the navigation application 60110 into processor B. The navigation icon 60120 in GUI 60118 then shows the navigation application 60110 running on processor B. At the same time the audio application icon 60124 is removed from GUI 60118.

Referring back to FIG. 2, a processor or application is accepted into the multiprocessor system by one or more of the device managers 6046. The configuration managers 6044 in the processors reconfigure the multiprocessor system to incorporate the processor or application. The data manager 6042 then detects what type of data is transmitted or received by the new device and determines the different processors and input/output devices in the multiprocessor system that can receive or transmit data to the new application or processor.

Figure 11:
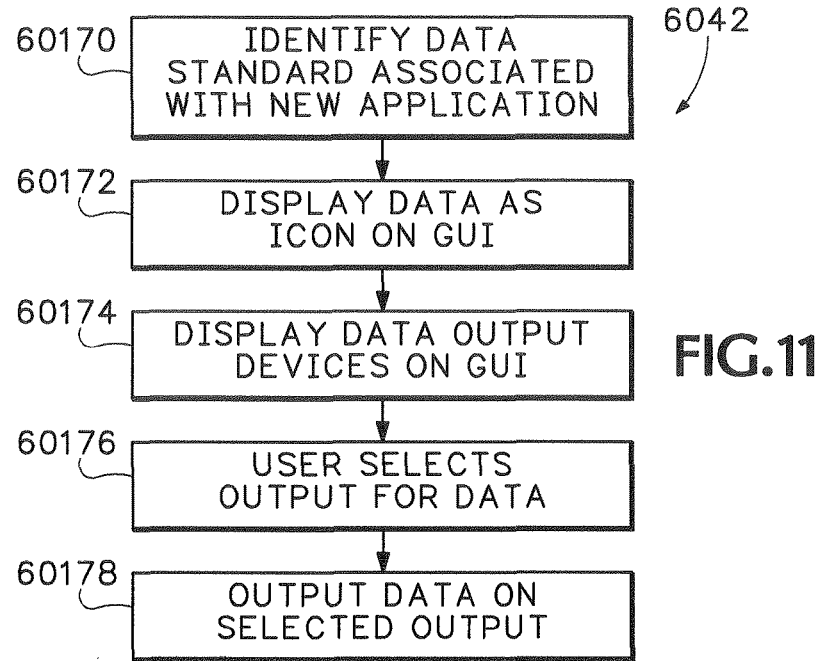
FIGS. 11 and 12 are diagrams showing how a data manager in the DC system operates.

FIG. 11 shows in further detail how the data manager 6042 in FIG. 2 operates. In block 60170, the data manager for one of the processors determines the data standard for the data that is either transmitted or received by a new device. For example, the new device may be a MP3 player that outputs streaming audio data. In another example, the new device may be a DVD player that outputs streaming video data in a MPEG format.

One or more of the data managers 6042, identifies the device by its data and the data, if applicable, is displayed on the graphical user interface in block 60172. The data manager then identifies any devices in the multiprocessor system that can output or transmit data to the new device in block 60174. For example, a newly detected audio source may be output from a car speaker. The data manager monitors for any user selections in block 60176. For example, the car operator may select the output from a portable CD player to be output from the car speakers. The data manager controlling the CD player and the data manager controlling the car speakers then direct the output from the CD player to the car speakers in block 60178.

Figure 12:
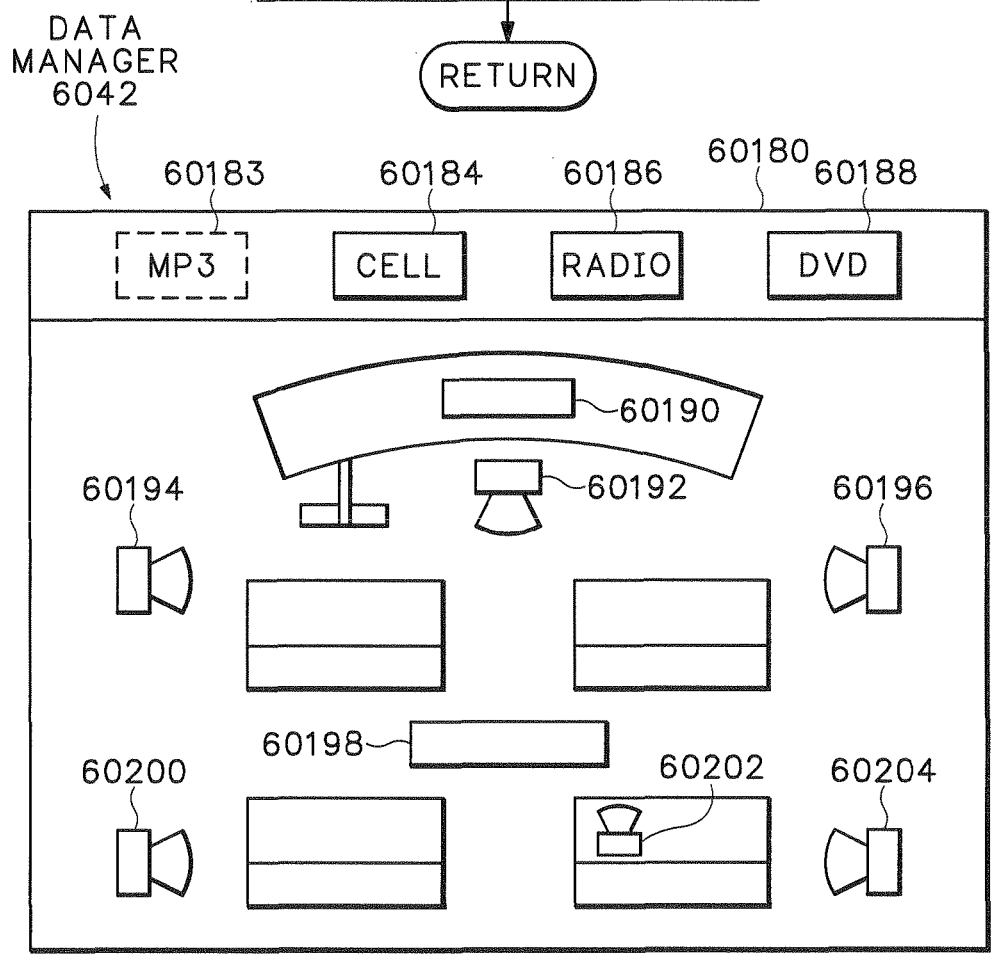

FIG. 12 gives one example of how the data managers 6042 in the multiprocessing system operate. A GUI 60180 displays the audio or video (A/V) sources in a car. For example, there are three devices detected in or around the car that are A/V sources. A cellular telephone detected in the car is represented by icon 60184, a radio is represented by icon 60186, and a DVD player is represented by icon 60188.

The A/V output devices in the car are shown in the lower portion of GUI 60180. For example, icons 60192, 60194,

60196, 60200, and 60204 show car audio speakers. An in-dash video display is represented by icon 60190 and a portable monitor is represented by icon 60198.

Currently, a car operator may be listening to the radio 60186 over speakers 60192, 60194, 60196, 60200 and 60204. However, a passenger may move into the backseat of the car carrying an MP3 player. The MP3 player runs the DC system 6010 described in FIG. 2 and sends out a signal to any other processors in the multiprocessor system 6008 in the car. The device manager 6046 and configuration manager 6044 in one of the processors verify the data format for the MP3 player and configure the MP3 player into the multiprocessor system.

One of the data managers 6042 determines the MP3 player outputs a MP3 audio stream and accordingly generates the icon 60182 on the GUI 60180. The data manager 6042 also identifies a speaker in the MP3 player as a new output source and displays the speaker as icon 60202. The car operator sees the MP3 icon 60182 now displayed on GUI 60180. The car operator can move the MP3 icon 60182 over any combination of the speaker icons 60192, 60194, 60196, 60200 and 60204. The output from the MP3 player is then connected to the selected audio outputs.

Audio data can also be moved in the opposite direction. The speaker icon 60202 represents the output of the portable MP3 player that the passenger brought into the backseat of the car. The car operator also has the option of moving one or more of the other audio sources, such as the cellular telephone 60184 or the radio 60186 icons over the speaker icon 60202. If the car operator, for example, moves the radio icon 60186 over the MP3 player speaker icon 60202 and the MP3 player can output the radio signals, the multiprocessor system redirects the radio broadcast out over the MP3 speaker.

Figure 13:
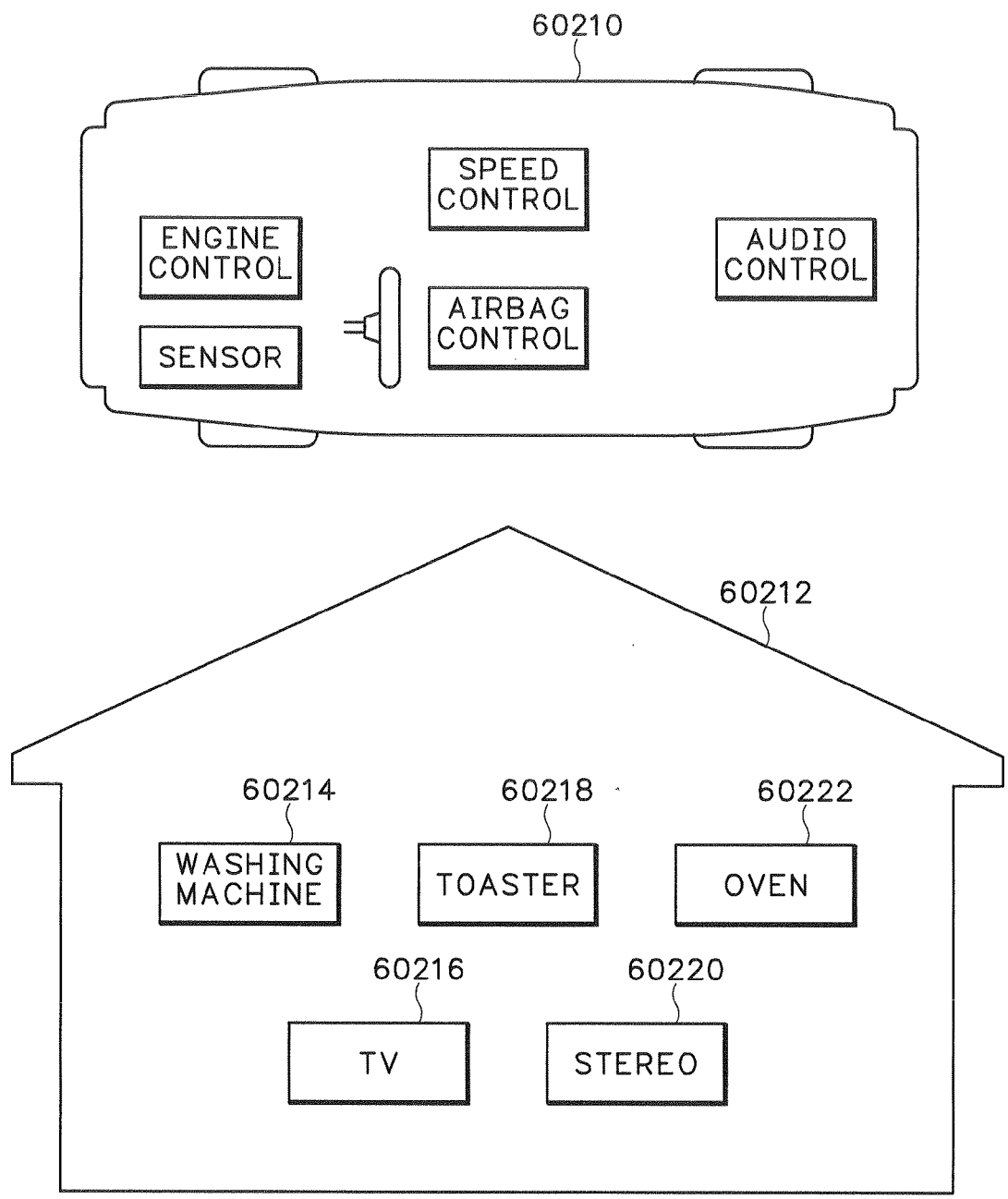
FIG. 13 is a diagram showing different multiprocessor systems that can use the DC DC system.

It should be understood that the multiprocessor system described above could be used in applications other than cars. For example, FIG. 13 shows a first GUI 60210 that shows different processors and applications that are coupled together using the DC system 6010 in an automobile. A GUI 60212 shows another multiprocessor system comprising multiple processors in the home. For example, a washing machine is shown by icon 60214. The DC system allows the washing machine processor to communicate and be configured with a television processor 60216, toaster processor 60218, stereo processor 60220, and an oven processor 60222.

Figure 14:
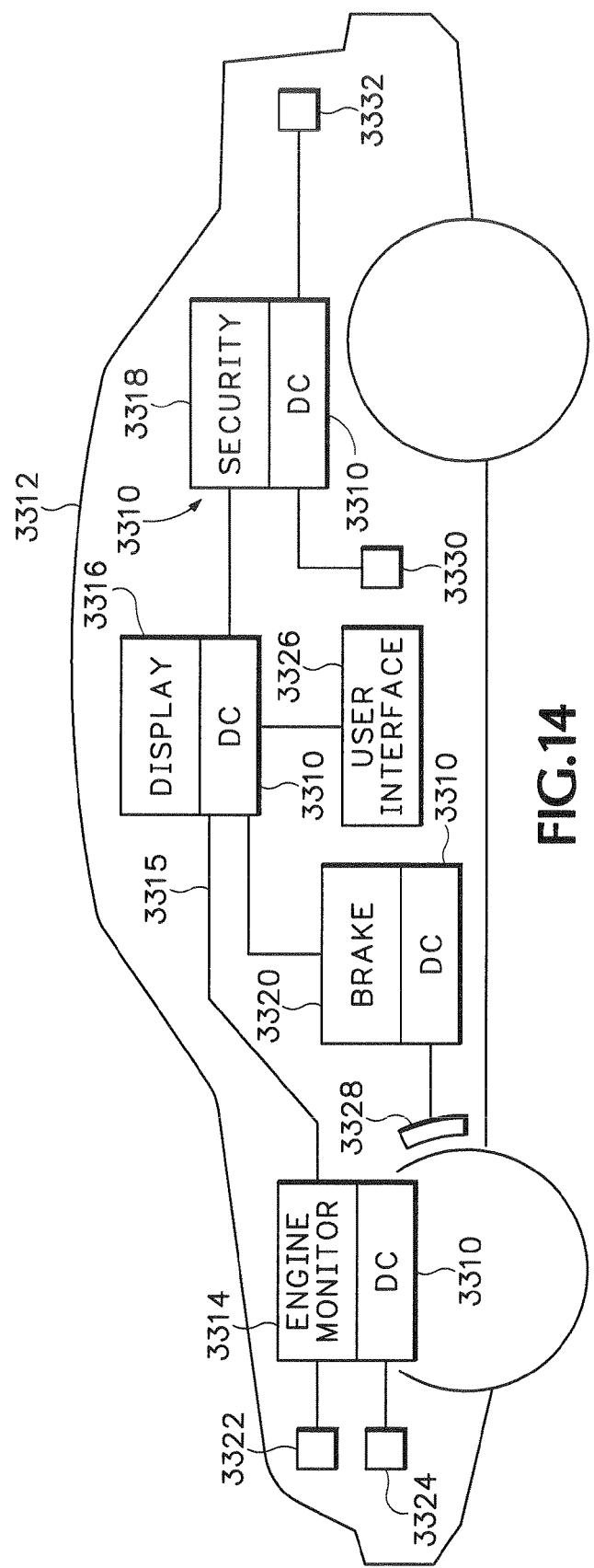
FIG. 14 is a diagram of a car that have multiple processors that each run an open communication system.

FIG. 14 shows a car 3312 that includes multiple processors 3314, 3316, 3318 and 3320. The engine monitor processor 3314 in one configuration monitors data from different sensors 3322 and 3324 in the car engine. The sensors 3322 and 3324 can be any sensing device such as sensors that monitor water temperature, oil temperature, fuel consumption, car speed, etc. The brake control processor 3320 monitors and controls an Automatic Braking System (ABS) 3328. The display processor 3316 is used to control and monitor a graphical or mechanical user interface. The security processor 3318 monitors and controls latches and sensors 3330 and 3332 that are used in a car security system.

Typical networks, such as in an office network environment, enable multiple computers to communicate with each other. Applications such as printing jobs can be launched from any one of the networked computers. If one of the networked computers crashes or is busy, a user must manually send the job to another computer. The other computer then handles the task like any other locally received task.

In a car environment, tasks must be processed with different priorities in real-time. For example, the braking tasks in the brake processor 3320 have to be processed with a high priority while a radio selection task performed in the display processor 16 can be processed with a relatively low priority.

The processors 3314, 3316, 3318 and 3320 all include software that runs an Open Communication (OC) system 3310 that enables the multiple processors to transfer data and exchange messages for performing these real-time car applications.

If the processor 3320 currently running the high priority braking application fails, the OC system 3310 allows the braking tasks to be offloaded to another processor in car 3312, such as the display processor 3316. The OC system 3310 automatically assigns a high priority to the braking tasks that allow the braking tasks to override lower priority tasks, such as the radio application, that are currently being performed in display processor 3316.

The OC system 3310 also ensures that data in each processor is processed in a secure manner for the car environment. The security portion of the OC system 3310 prevents unauthorized devices from accessing the different car applications. The OC system 3310 also includes a logging portion that allows data in the car system to be automatically logged. This is important for accident reconstruction purposes. The OC system 3310 also allows different processors to communicate over different communication protocols and hardware interfaces. Any processor that includes an OC system 3310 can be integrated in the system shown in FIG. 14. This allows different processors and different applications can be seamlessly replaced and added to the overall multiprocessor system.

The description below gives only a few examples of the different processors and different applications that can implemented using the OC system 3310. However, any single or multiprocessor system located either inside or outside of car 3312 can communicate and exchange data using the OC system 3310. It should also be understood that the OC system 3310 can be used in any real-time network environment such as between processors used in appliances and computers in the home.

Figure 15:
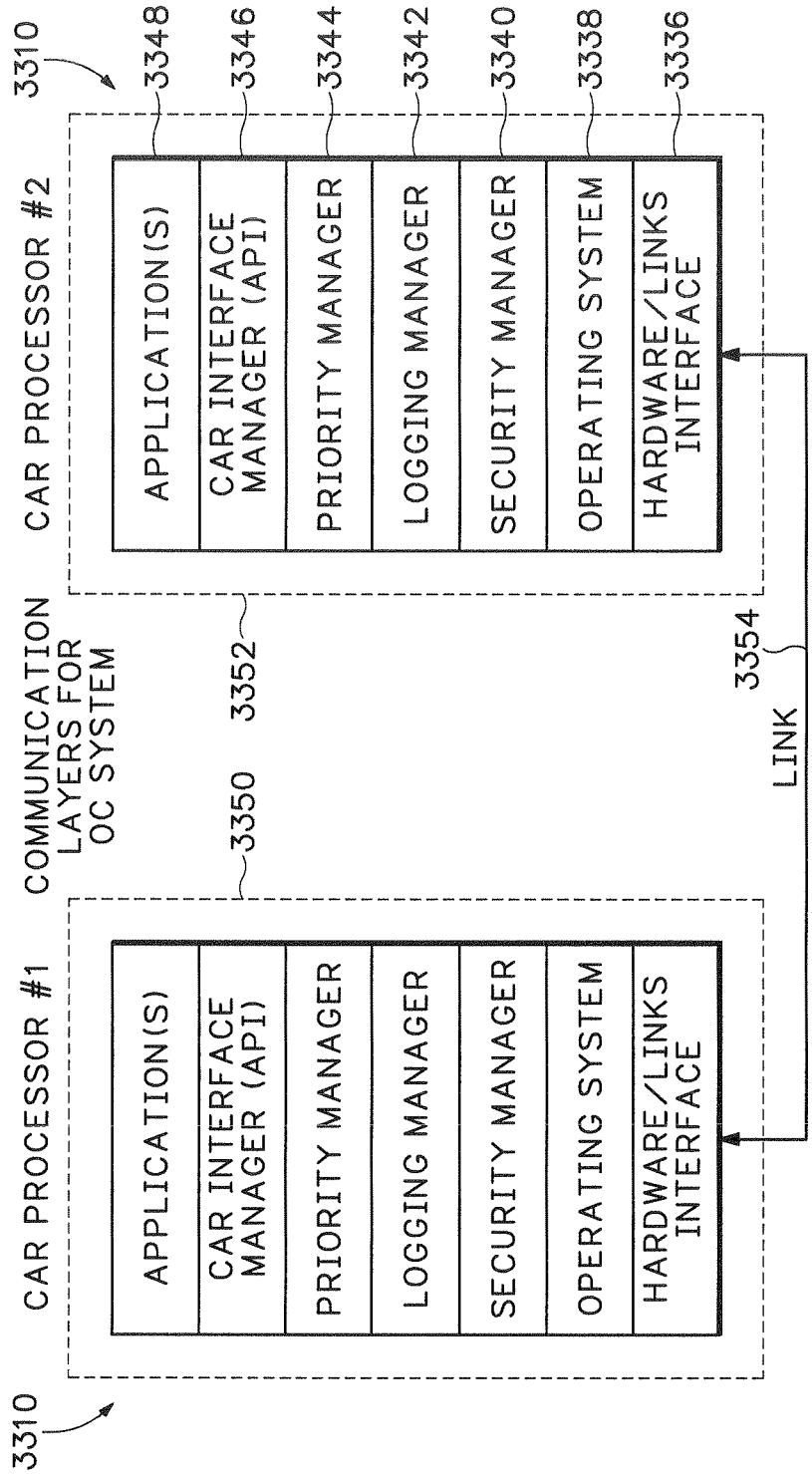
FIG. 15 is a block diagram of the open communication system shown in FIG. 14.
Figure 16:
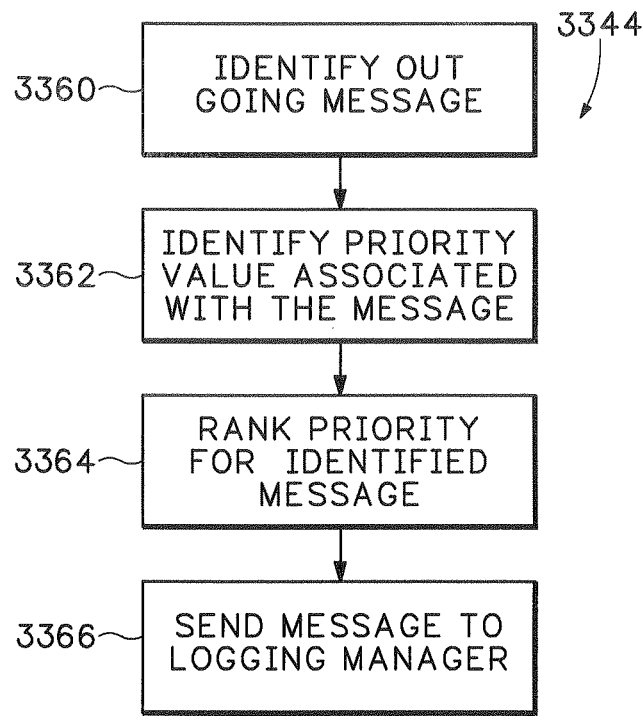
FIG. 16 is a flow diagram showing how a priority manager processes outgoing data in the open communication system.

FIG. 15 is a block diagram of the communication managers used in the OC system 3310 described in FIG. 14. The different communication managers in the OC system 3310 are configured to provide the necessary control for operating a distributed processor system in a real-time car environment. Applications 3348 are any of the different applications that can be performed for the car 3312 shown in FIG. 14. For example, applications can include car displays, braking control, security systems, sensor monitoring, airbag deployment, etc. One or more applications can be run in the same processor at the same or at different times.

A car interface manager 46 operates as an Application Programmers Interface (API) that can be implemented in any variety of different languages such as Java, C++, Extensible Markup Language (XML) or HyperText Markup Language (HTML), etc. The car interface manager 3346 enables applications 3348 to be written in any variety of different languages. This prevents the applications 3348 from having to be written specifically for the car environment or for a specific communication protocol. Thus, applications written for other systems can be reused in the car system described below. The car interface manager 3346 reads basic processing and data transfer commands needed to transfer data and messages between different processors and storage mediums inside or outside the car 3312.

For clarity the terms 'message' and 'data' are used interchangeably below. After a message passes through the car interface manager 3346, a priority manager 3344 determines a priority value for the message that determines how the message is processed both in the local processor 3350 and in other processors such as processor 3352. Referring to FIG.

16, an outgoing message is identified by the priority manager 3344 in block 3360. A priority for the message is identified in block 3362 by reading a priority value that the generic car interface manager 3346 has attached to the message.

In block 3364, the priority manager 3344 compares the priority value for the outgoing message with the priority values for other messages in the processor. The priority manager 3344 ranks the outgoing message with respect to the other messages and then sends the message to the logging manager 3342 in block 3366 (FIG. 15). For example, there may be several messages that either need to be output or received by a particular processor. An output message with a high priority value, such as a crash indication message, will be assigned higher priority than other messages and will therefore be immediately transmitted by the processor 3350 before other lower priority messages.

Figure 17:
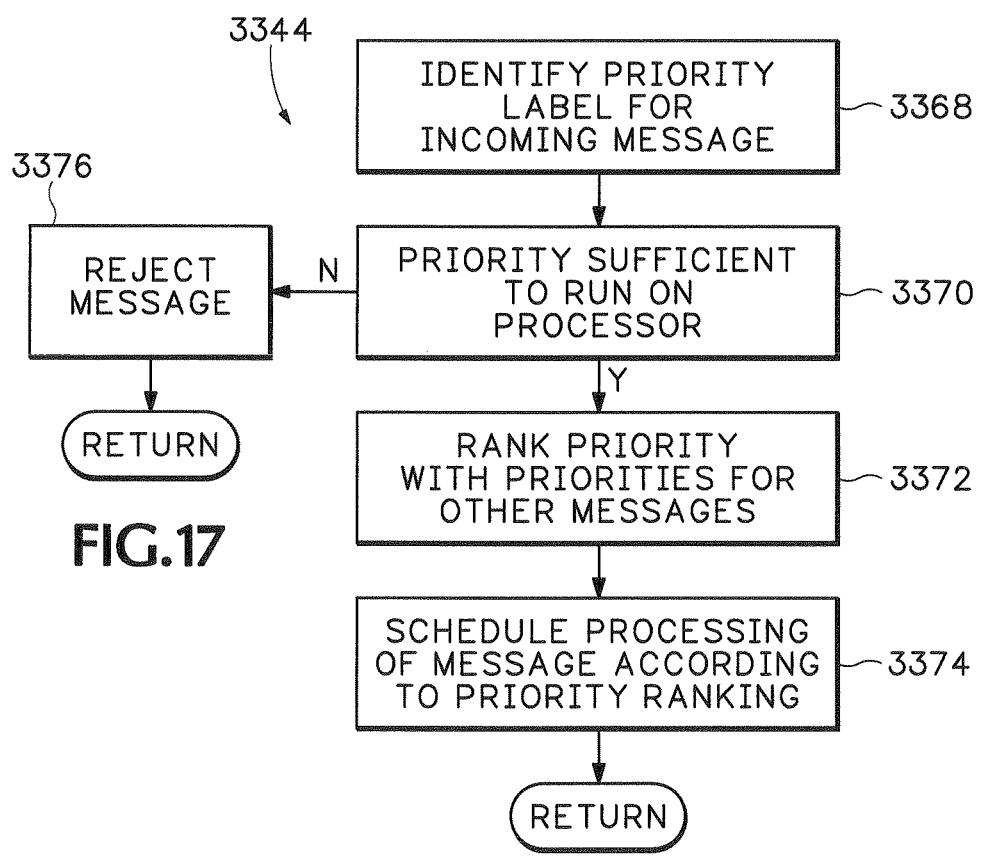
FIG. 17 is a flow diagram showing how the priority manager receives data in the open communication system.

FIG. 17 shows how the priority manager 3344 receives messages from other processors. There may be multiple applications running on the same processor and multiple messages and data sent from other processors to those applications. For example, multiple sensors may be sending different types of data to a video display application running on one of the processor 3350 (FIG. 15). That same processor 3350 may also be receiving different types of sensor data for running an airbag deployment application. The priority manager 3344 determines the order that messages are processed by the different applications that reside on processor 3350.

In block 3368, the priority manager 3344 reads the priority labels for incoming messages. If the priority of the message is not high enough to run on the processor in block 3370, the data or message is rejected in block 3376. The priority manager 3344 may send out a message to the sending processor indicating the message has been rejected. In some situations, the message or data may have such a low priority that an acknowledge message does not have to be sent back to the sending processor. For example, inside temperature data from a temperature sensor may be sent to one or more processors with no requirement that the processor accept or acknowledge the data. In this case the temperature data is sent with a very low priority value that indicates to the priority manager 3344 that no message needs to be sent back to the temperature sensor even if the data is rejected.

The priority manager 3344 in block 3372 ranks the priority of the incoming message in relation to the priorities of all the other messages in the processor. The priority manager in block 3374 decides according to the ranking whether the message should be put in a queue or sent directly to the application for immediate processing. For example, a crash indication message may have a high enough priority to cause the priority manager 3344 to delay all data currently being processed by all other applications in the same processor. The priority manager 3344 directs all the applications to wait while the current high priority crash indication message is processed. The other data and messages are queued in the processor and processed after the crash indication message has been completed.

Figure 18:
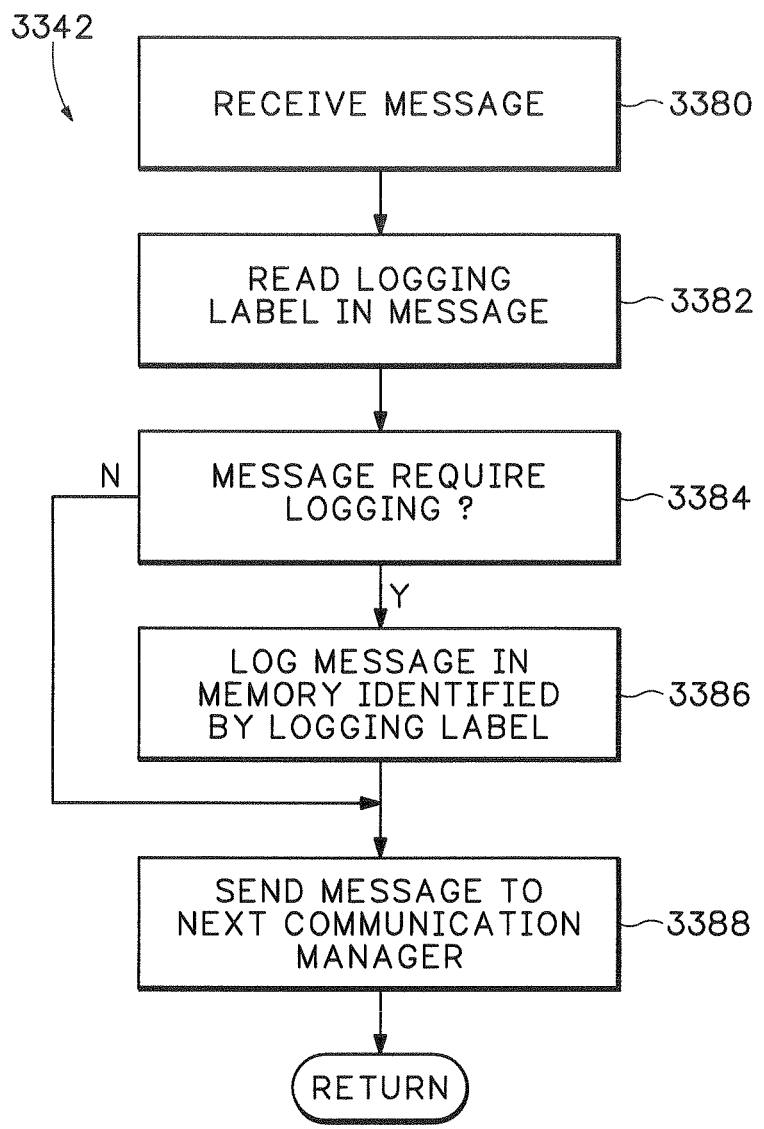
FIG. 18 is a flow diagram showing how a logging manager processes data in the open communication system.

Referring to FIGS. 15 and 18, a logging manager 3342 controls what data is logged by different processors. It may be important to log critical failures that occur during an accident. For example, it may be important to verify that a particular processor sent an air bag deployment message and that another processor successfully received the airbag deployment message. This would allow insurance companies and other entities to reconstruct accidents by identifying when and where different messages were sent and received.

The logging manager 3342 receives either an incoming message over a communications link for sending to a local application 3348 or receives an outgoing message from one of the local applications 3348 for sending out over the communications link to another processor in block 3380. The logging manager 3342 reads a logging label in the message in block 3382. If the logging label indicates that no logging is required, the message is sent on to the next communication manager in block 3388. If it is an outgoing message it is sent to the security manager 3340 (FIG. 15). If it is a incoming message it is sent to the priority manager 3344. If the message requires logging, the logging manager 3342 stores the message in a memory in block 3386. The logging label may indicate a particular type of memory for logging, such as a nonvolatile Flash memory or, if available, a high volume hard disk peripheral memory.

The logging manager 3342 in each processor, provides the OC system 3310 with the unique ability to track when and where messages are sent and received at different processors in the multiprocessor car system. This is important in accident reconstruction allowing the logging managers 3342 to identify which processors and applications failed and also the sequence in which the different processors and associated applications failed.

The logging manager 3342 can also track unauthorized messages and data that may have caused any of the processors in the car to crash. For example, an audio processor that handles audio applications in the car may crash due to unauthorized downloading of MP3 music from a laptop computer. The logging manager 3342 can log the unauthorized data received from the laptop MP3 player. The logging manager 3342 logs any data that does not have a particular security or priority label value. A system administrator can then down load the MP3 data to identify what caused the audio processor to crash.

Figure 19:
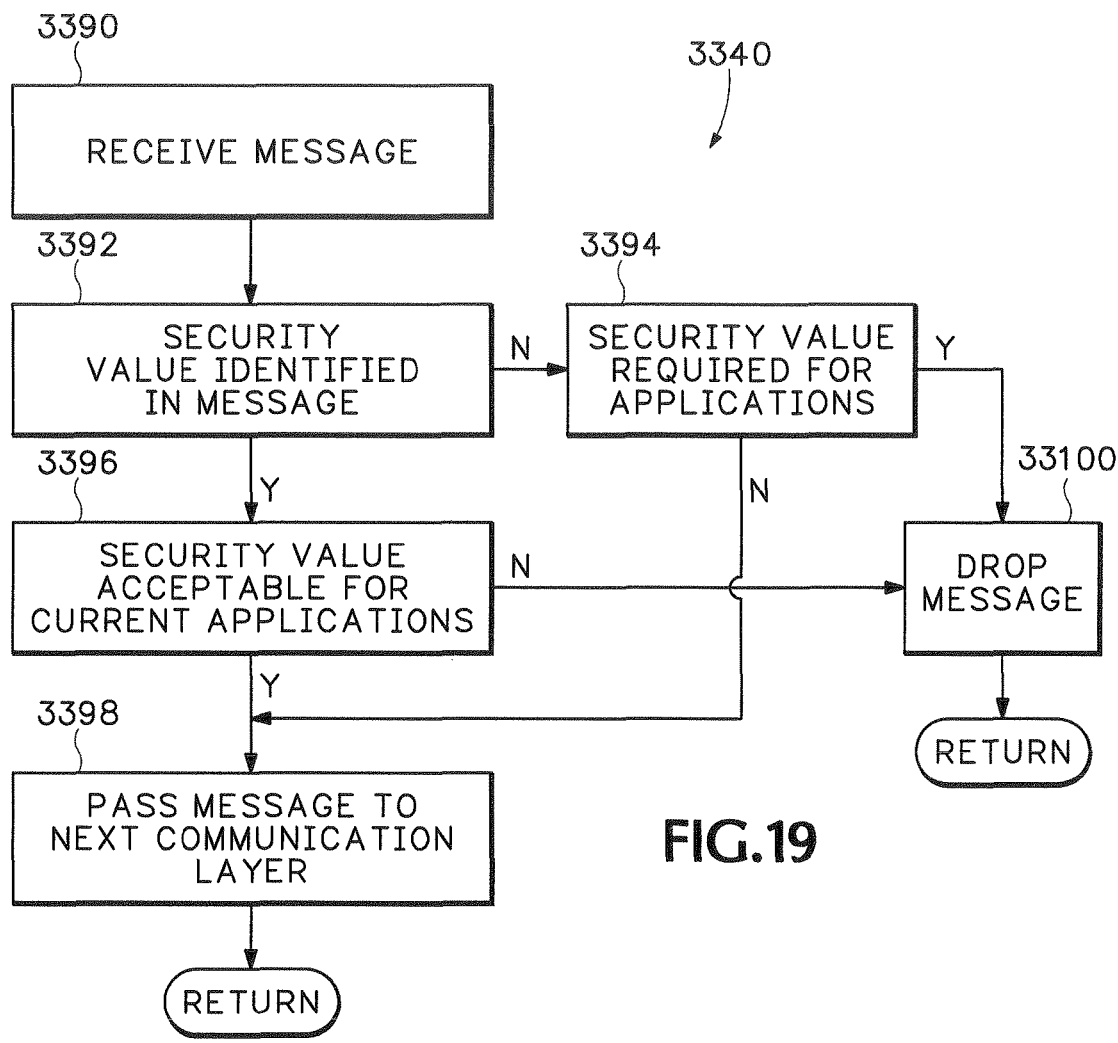
FIG. 19 is a flow diagram showing how a security manager processes data in the open communication system.

Referring to FIGS. 15 and 19, a security manager 3340 provides security for applications both receiving and transmitting messages. For instance, a laptop computer may be connected to a Ethernet port in the car 3312 (FIG. 14). If the laptop computer does not use the OC system 3310, data from that laptop application is not allowed to access certain processors or certain applications in the car 3312. For example, audio data should not be sent or processed by a processor that performs car braking control.

The security manager 3340 in block 3390 reads a message either received from an application on the same processor or received over a communication link from another processor. The security manager 3340 determines if there is a security value associated with the message in block 3392. If there is no security value associated with the data, the security manager 3340 may drop the data in block 33100. However, some applications, such as a processor that plays audio data may not require a security label. In this case, the security manager in block 3394 allows the data to be passed on to the application in block 3398.

In other instances the data or message may have a security value, but that security value is not sufficient to allow processing on the present applications. For example, data for car security monitoring may be sent to a processor that controls air bag deployment and an automatic braking system. The two currently running applications may set a minimum security level for receiving data. If data received from other processors do not have that minimum security level in block 3396, the data is dropped in block 33100. Otherwise, the data or message is passed on to the next communication layer for further processing in block 3398. Thus the security manager 3340 prevents unauthorized data or messages from effecting critical car applications.

Referring back to FIG. 15, an operating system layer 3338 identifies the communication platform used for communicating the data or message over a link identified in a hardware/link interface 3336. The operating system 3338 then formats the message for the particular communication stack and medium used by the identified link 3354. For example, the operating system layer 3338 may identify a first message being transmitted over a Bluetooth wireless link and a second message transmitted over a Transmission Control Protocol/Internet Protocol (TCP/IP) packet switched link. The data or message adds whatever headers and formatting is necessary for transmitting the first message over the Bluetooth wireless link and the second message over the TCP/IP hardwired link.

The hardware/link interface 3336 includes the software and hardware necessary for interfacing with different communication links 3354. For example, the two processors 3350 and 3352 may communicate over a Ethernet link, 802.11 wireless link, or hardwired Universal Serial Bus link, etc. The software necessary for the two processors to communicate over these different interfaces is known to those skilled in the art and is therefore not described in further detail.

Figure 20:
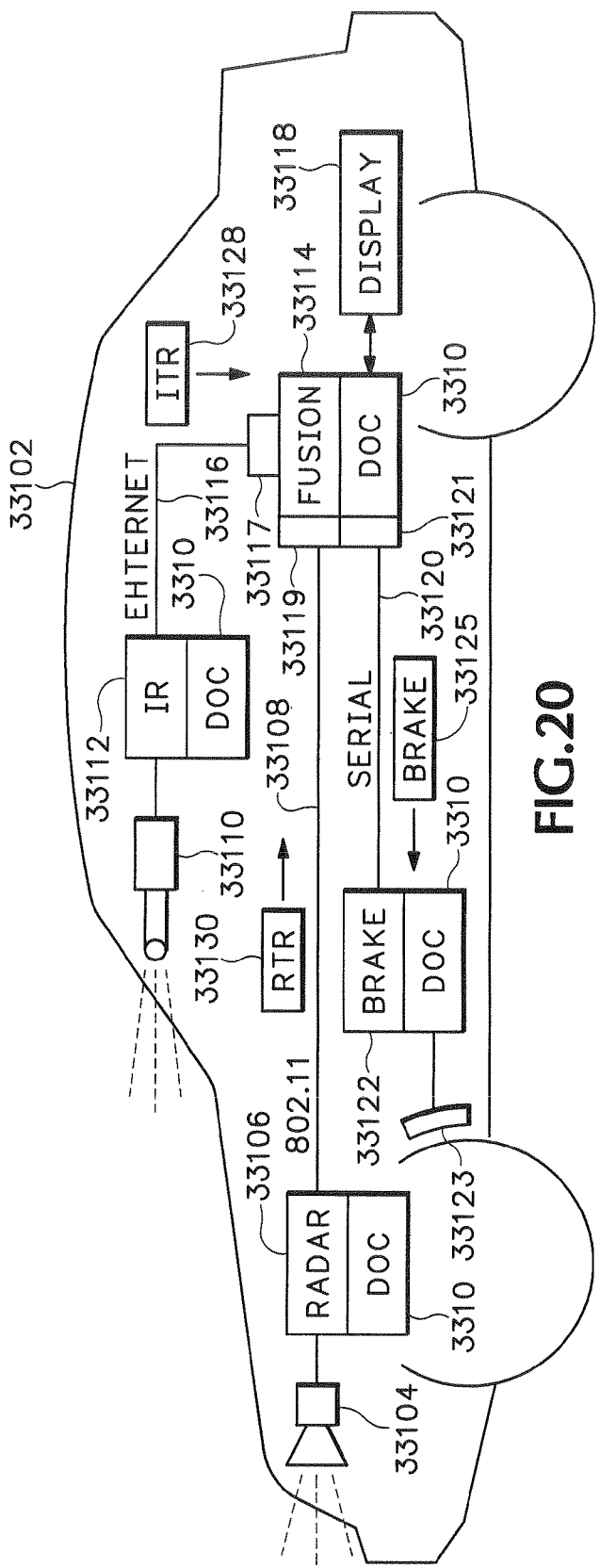
FIG. 20 is a diagram showing one example of how the open communication system is used by different processors.

FIG. 20 describes one example of an application that uses the OC system 3310 described above in FIGS. 14-19. A car 33102 includes an radar sensor 33104 that is controlled by a radar processor 33106. The radar sensor 33104 is located in the front grill of car 33102. An InfraRed (IR) sensor 33110 is controlled by an IR processor 33112 and is located on the front dash of car 33102. A braking system 33123 is controlled by a brake control processor 33122. The IR processor 33112 is connected to a fusion processor 33114 by an Ethernet link 33116 and the radar processor 33106 is connected to the fusion processor 33114 by a 802.11 wireless link 33108. The brake processor 33122 is connected to the fusion processor 33114 by a CAN serial link 33120. The fusion processor 33114 is also coupled to a display screen 33118.

The radar sensor 33104 in combination with the radar processor 33106 generates Radar Track Reports (RTRs) 33130 that are sent to the fusion processor 33114. The IR sensor 33110 in combination with the IR processor 33112 generate Infrared Track Reports (ITRs) 33128 that are sent to the fusion processor 33114.

Figure 21:
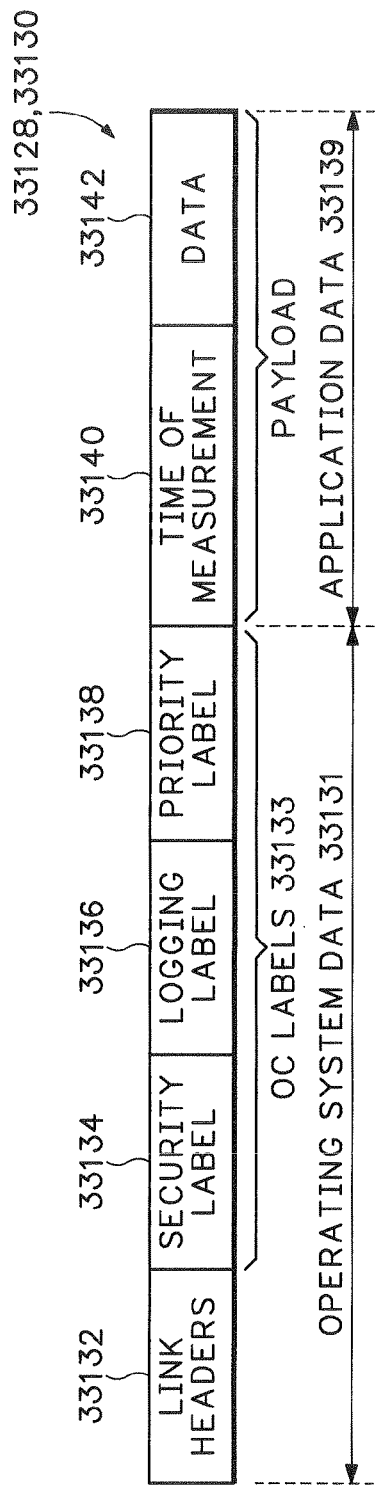
FIG. 21 is a diagram of a tracking report that is generated by the open communication system.

Referring to FIG. 21, each track report 33128 and 33130 includes communication link headers 33132 for communicating over an associated interface medium. In this example, the radar track report 33130 includes the link headers 33132 necessary for transmitting data over the 802.11 link 33108. The infrared track report 33128 includes the link headers 33132 for transmitting data over the Ethernet link 33116.

The track reports 33128 and 33130 include Open Communication (OC) labels 33133 for performing the OC operations described above. A security label 33134 is used by the security manager for preventing unauthorized data from being downloaded into one of the car processors and disrupting applications. A logging label 33136 is used by the logging manager to identify data that needs to be logged in a local memory. The priority label 33138 is used by the priority manager for scheduling messages or data to the applications run by the processors. The link headers 33132, security label 33134, logging label 33136 and priority label 33138 are all part of the data 33131 used by the open operating system 33131.

The radar processor 33106 and IR processor 33112 also send a time of measurement 33140 and other data 33142 from the radar sensor 33104 and IR sensor 33110, respectively. The data 33142 can include kinematic states of objects detected by the sensors. The time of measurement data 33140 and other sensor data 33142 is referred to as application data 33139 and is the actual data that is used by the application.

Figure 22:
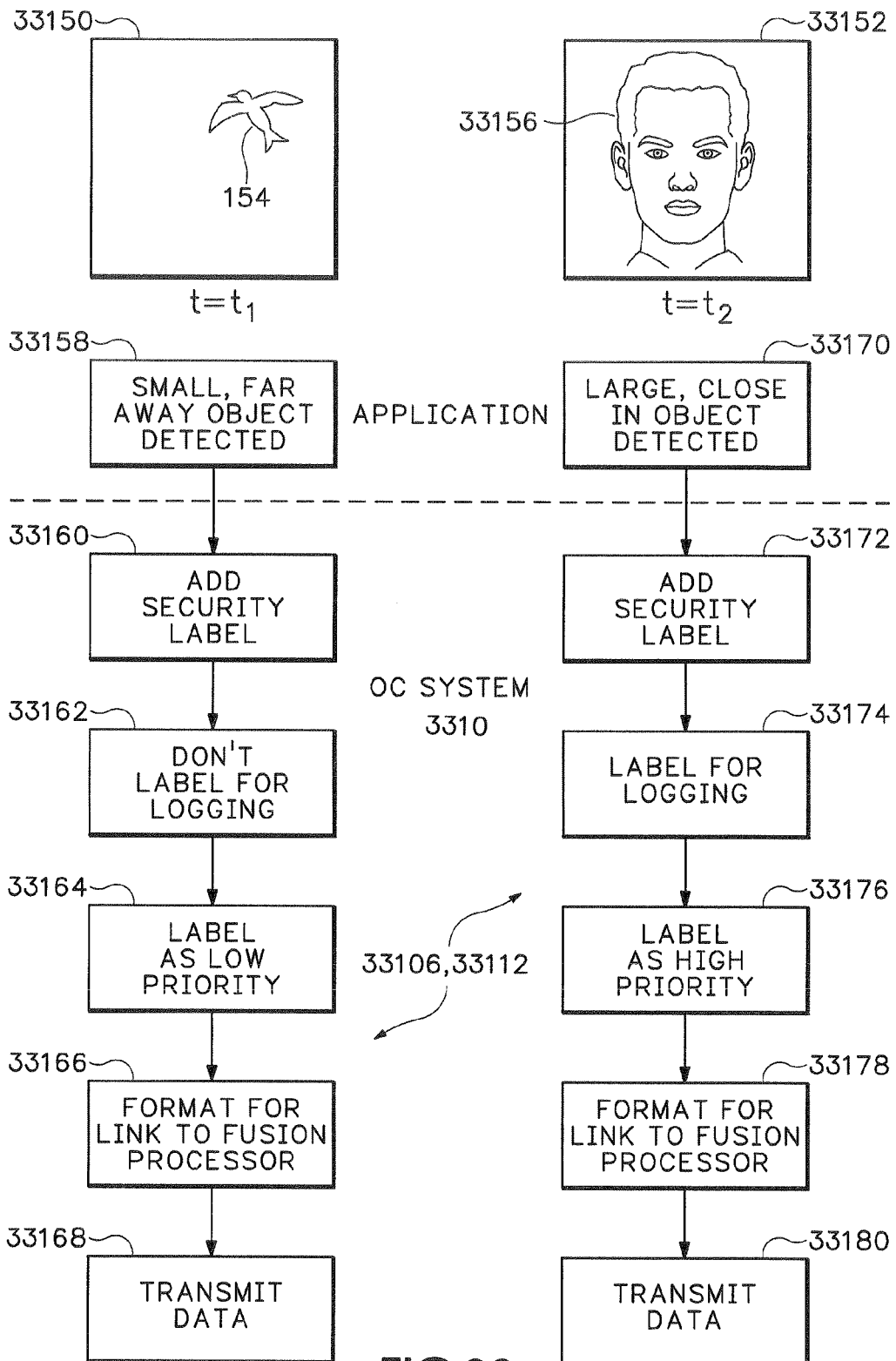
FIG. 22 is a flow diagram showing how different image data is processed and transmitted using the open communication system.
Figure 23:
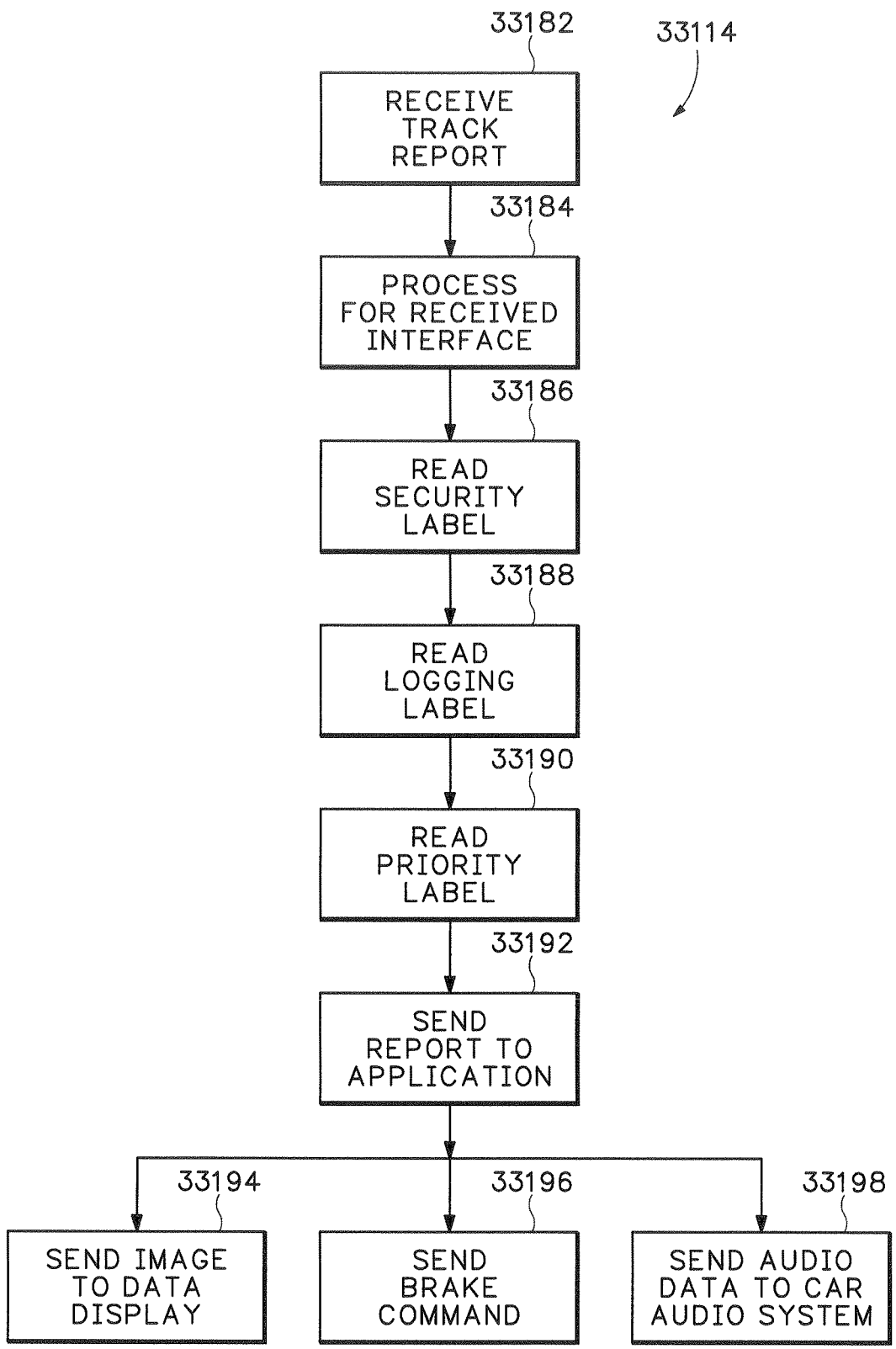
FIG. 23 is a flow diagram showing how the transmitted image data in FIG. 22 is received and processed using the open communication system.

FIGS. 22 and 23 show one example of how the radar and infrared sensor data is processed by the OC system 3310. One or both of the radar processor 33106 and the IR processor 33112 may generate image data 33150 and 33152 for the area in front of the car 33102 (FIG. 20). For simplicity, the discussion below only refers to an image generated by radar sensor 33104. At a first time $t=t.sub.1$, sensor 33104 detects a small far away object 33154. At another time $t=t.sub.2$, sensor 33104 detects a large up-close object 33156.

The applications described below are all performed by the OC system 3310 thus preventing the applications from having to handle the tasks. This allows the applications to be written in a completely portable fashion with no knowledge of the network hardware, security, priority and logging operations. This greatly reduces the cost of creating applications.

An image processing application in the processor 33106 identifies the object 33154 as a small far away object in block 33158. The image and kinematic data for the object is output by the OC system 3310 as a radar track report 33130. The security manager 3340 (FIG. 15) in the radar processor 33106 adds a security label 33134 to the report in block 33160 and the logging manager 3342 may or may not add a logging label to the report in block 33162. In this example, the object 33154 has been identified by the image processing application as a small far away object. Therefore, the logging manager does not label the track report for logging. The priority manager 3344 (FIG. 15) adds a priority label 33138 (FIG. 21) to the report in block 33164. Because the image processing application identifies the object 33154 as no critical threat (small far away object), the priority label 33138 is assigned a low priority value in block 33164.

The OC system 3310 then formats the radar track report in block 33168 according to the particular link used to send the report 33130 to the fusion processor 33114. For example, the operating system 3338 and the hardware/link interface 3336 (FIG. 15) in the radar processor 33106 attaches link headers 33132 to the track report 33130 (FIG. 21) for transmitting the report 33130 over the 802.11 link. The track report 33130 is then sent out over the link 33108 in block 33168 to the fusion processor 33114.

Referring next to FIGS. 20-23, the fusion processor 33114 includes a wireless interface 33119 that communicates with the wireless 802.11 link 33108 and an Ethernet interface 33117 that communicates with the Ethernet link 33116. The hardware/link interface 3336 in the fusion processor OC system 3310 uses the link headers 33132 (FIG. 21) to receive the radar track report 33130 in block 33182 and process the reports in block 33184 (FIG. 23).

The OC system 3310 reads the security label in block 33186 to determine if the track report has authority to be processed by the fusion processor 33114. If the track report passes the security check performed by the security manager in block 33186, the logging manager in block 33188 checks to see if either the received radar data needs to be logged. In this example, the image processing application in the radar processor identified the object 33154 (FIG. 22) to be within a particular size range and distance range that does not indicate a critical crash situation. Therefore, the track report 33130 was not labeled for logging. The fusion processor 33114 therefore does not log the received report in block 33188.

Because the image 33150 was identified as non-critical, the priority label 33138 (FIG. 21) for the track report 33130 is given a low priority value. The fusion processor 33114 ranks the track report with the other data that is being processed and then processes the report according to the ranking.

Different applications in the fusion processor 33114 may or may not be performed depending on the track report. For example, the object 33154 may be sent to a video display in block 33194. However, the fusion processor 33114 will not send a brake command in block 33196 to the car braking system 33123. This is because the image has been identified as non-critical. Similarly, no audio warning is sent to the car audio system in block 33198 because the object has been identified as non-critical.

Referring back to FIG. 22, in another example, the IR processor 33112, the radar processor 33106, or both, in block 33170 detect at time t.sub.2 an object 33156 that is large and close to the car 33102. For simplicity, it is assumed that only the IR processor 33112 has identified object 33156. The IR processor 33112 generates a track report 33128 in block 33170 and the OC system in the IR processor 33112 adds a security label 33134 (FIG. 21) to the report in block 33172. Because the object 33156 has been identified as being within a predetermined size and within a predetermined range of car 33102 (critical data), the logging manager in the IR processor 33112 assigns a logging label value 33136 to the IRT 33128 that directs all processors to log the image data 33142. The image data is logged by the IR processor 33112 in a local memory in block 33174.

Because the IR track report 33128 has been identified as critical data, the priority manager 3344 in the IR processor 33112 assigns a high priority label value 33138. This high priority value is read by the operating system 3338 and interface hardware 3336 (FIG. 15) in blocks 33178 and 33180. Accordingly the IR track report 33128 is given preference when being formatted in block 33178 and transmitted in block 33180 over Ethernet link 33116 to the fusion processor 33114.

Referring again to FIG. 23, the IR track report 33128 is received by the fusion processor 33114 in block 33182 and the link processing performed in block 33184. This link processing is known to those skilled in the art and is therefore not described in further detail The report may be given higher link processing priority in the fusion processor 33114 based on a priority value assigned in the link headers 33132.

The security manager 3340 in the fusion processor 33114 confirms there is an acceptable value in the security label in block 33186 and then passes the IR track report 33128 to the logging manager in block 33188. The logging manager 3342 in the fusion processor 33114 reads the logging label and accordingly logs the image data in a local nonvolatile memory. This provides a history of the image 33156 that was detected by the IR sensor 33110.

The logged image data may then be used in subsequent accident analysis. For example, an accident reconstruction specialist can download the logged image data or message in both the IR processor 33112 and in the fusion processor 33114 to determine when the image data 33140 and 33142 was first detected. It can then be determined whether the image data was sent by the IR processor 33112 and received by the fusion processor 33114.

The priority manager reads the priority label 33138 in block 33190 and determines that the IR track report has a high priority. Accordingly, the track report is immediately sent to different applications in block 33192. The priority manager 3344 may first send the track report to the brake control application in block 33196. The brake control application immediately sends a brake command 33125 (FIG. 20) to the brake processor 33122.

The logging manager 3342 in the fusion processor 33114 adds a logging label 33136 to the outgoing brake command 33125. Both the fusion processor 33114 and the brake control processor 33122 will then both log the brake command 33125. Thus, not only is the sequence of transmissions of the image data and messages logged in both the IR processor 33112 and fusion processor 33114 but also the sequence of the brake message 33125 from the fusion processor 33114 to the brake processor 33122. This further adds to any accident analysis data that may need to be obtained from the car if an accident occurs.

The IR data may also be sent to an audio application in block 33198 that immediately sends out an audio alarm over the car stereo system or out over a car horn. This automatically warns both the car driver and the object 33156 in front of car 33102 of a possible collision. In a third application, the fusion processor 33114 may send the IR image data to an image display 33118 in block 33194.

Figure 24:
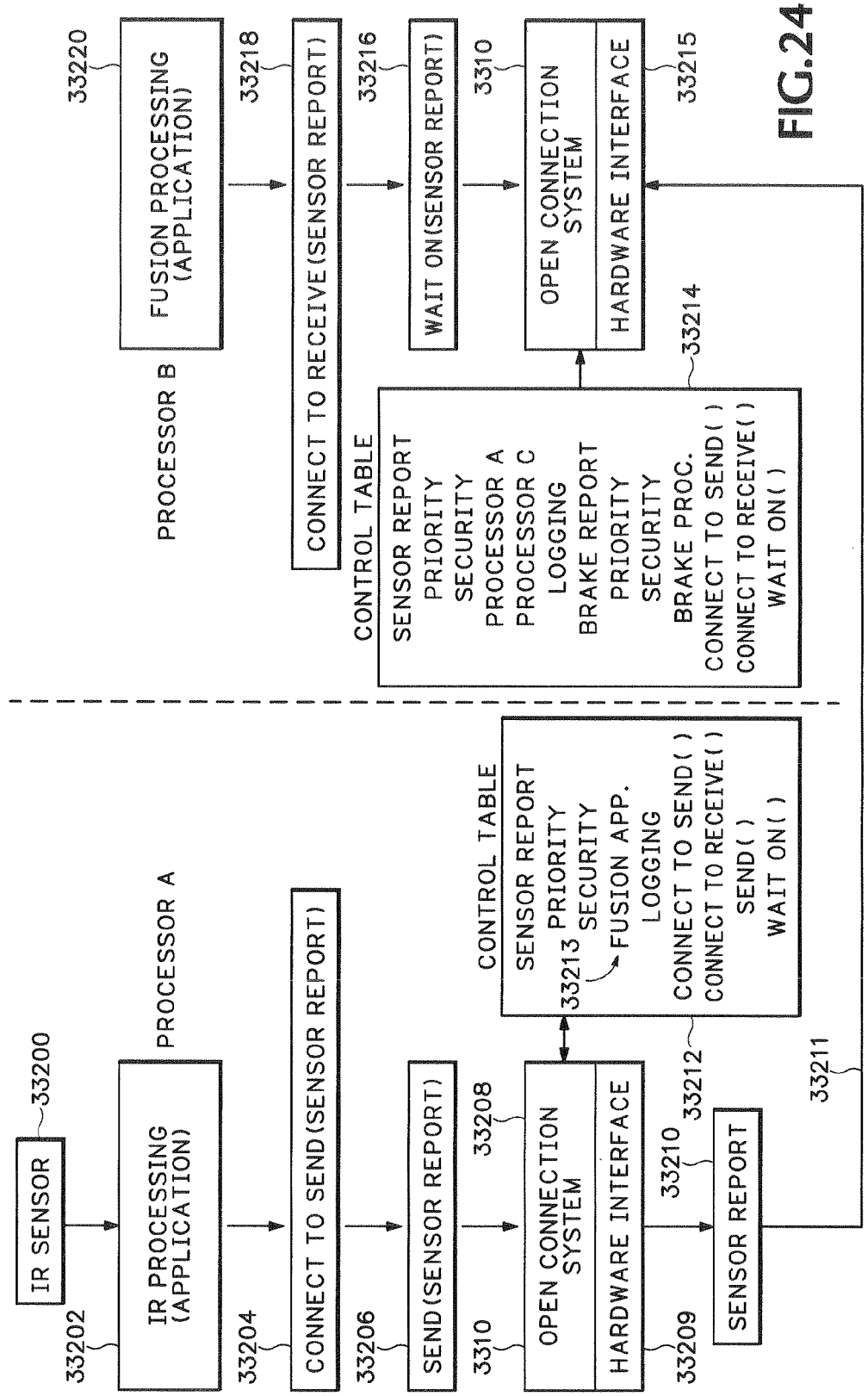
FIG. 24 is a block diagram showing another example of how the open connection system operates.

FIG. 24 is a block diagram showing another example of how the OC 3310 exchanges information according to the type of data independently of the physical links that connect the different applications together. A processor A runs an application 33202. In this example, the application 33202 is an IR processing application that receives IR data from an IR sensor 33200 and outputs the IR data as a sensor report. A processor B runs a fusion processing application 33220 that controls other car functions in part based on the IR sensor report.

The OC system 33208 includes a control table 33212 that includes several parameters associated with a SENSOR REPORT 33210. For example, the SENSOR REPORT 33210 may need to include a priority label, a security label or a logging label. The security label also includes one or more locations where the SENSOR REPORT 33210 should be sent. The IR application 33202 includes a CONNECT TO SEND (SENSOR REPORT) command that the OC 3310 then uses to establish a slot in memory for the SENSOR REPORT. When IR data is received from the IR sensor 33200, the IR application 33202 generates sensor data (FIG. 21) for the SENSOR REPORT 33210 and stores that sensor data in the memory slot established by the OC system 3310. The sensor data is contained within the application data section 33139 of the sensor report shown in FIG. 21. The IR application 33202 then issues the SEND(SENSOR REPORT) command 33206 to notify the OC 3310 that there is a SENSOR REPORT in the reserved slot in memory.

The OC system 3310 attaches a security label 33134, logging label 33136 and priority label 33138 to the SENSOR REPORT 33210 as described previously in FIG. 21. The OC system 3310 then adds the necessary link headers 33132 (FIG. 21) that are required to send the SENSOR REPORT 33210 to other identified applications. The control table 33212 includes security parameters associated with the SENSOR REPORT data type. One of the SENSOR REPORT security parameters, in addition to a security value, is an identifier 33213 for the fusion application 33220 running in processor B. The identifier 33213 identifies whatever address, format, and other protocol information is necessary for transmitting the SENSOR REPORT 33210 to the fusion application 33220. The OC system 3310 attaches the link headers 33132 to the SENSOR REPORT 33210 and then sends the report through a hardware interface 33209 over a link 33211 to processor B.

The fusion application 33220 works in a similar manner and initiates a CONNECT TO RECEIVE (SENSOR REPORT) command to the OC system 3310 running in the same processor B. The OC system 3310 reserves a slot in local memory for any received SENSOR REPORTs 33210. The fusion application 33220 issues a WAIT ON (SENSOR REPORT) command that continuously waits for any SEN- SOR REPORTs 33210 sent by the IR application 33202. The OC system 3310 control table 33214 also identifies from the SENSOR REPORT data type the communication link 33211, hardware interface 33215 and other associated communication protocols used for receiving the SENSOR REPORT 33210.

Whenever a SENSOR REPORT 33210 is received, the OC system 3310 in processor B performs the security, logging and priority management operations described above based on the labels 33134, 33136 and 33138 in the sensor report 33210 (FIG. 21). The OC system 3310 then places the sensor data from the SENSOR REPORT 33210 in the memory slot reserved in local memory. The OC system 3310 detects the data in the reserved memory slot and processes the sensor data. Another portion of the fusion application 33220 may send out a BRAKE command based on the sensor data. The control table 33214 for the OC system 3310 in processor B also includes the necessary system parameters for sending a BRAKE REPORT to another processor in the multiprocessor system, such as a brake processor.

The communication link between the fusion application 33220 and the brake application may be completely different than the link between the IR application 33202 and the fusion application 33220. However, the fusion application 33220 outputs the SENSOR REPORT and the BRAKE REPORT in the same manner. The OC system 3310 then uses stored link information in the control table 33214 to communicate to the IR application 33202 and the brake application over different links.

Thus, the IR application 33202 and the fusion application 33220 do not need to know anything about the physical links, address, or any of the other operations that are used to transmit data over different communication links.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. An application management system used in a vehicle, comprising:
   multiple processors located on-board the vehicle and adapted to run real-time vehicle applications;
   a communication system configured to couple the multiple processors together over multiple communication links;
   a device manager for automatically detecting and adding at least one new device to the on-board multiprocessor system, wherein the at least one new device is at least one of portable and a cell phone;
   a data manager that identifies data generated by the new device and identifies at least one other device in the multiprocessor system that can display at least some of the identified data;
   a dynamic configuration system run on at least one of the multiple on-board processors, comprising:
     a configuration manager configured to:
       operate on the at least one of the multiple processors,
       store critical information about the application running on the multiple processors,
       automatically detect application failure,
       responsive to detecting application failure, initiate a reconfiguration process,
       download from memory the stored critical data associated with the failed application,
       initiate a reboot operation for the failed application; and
     a priority manager for determining a priority value of a message, wherein the priority value determines how messages are processed in at least one of the multiple on-board processors and the new device, responsive to determining a priority value for the message, determine which messages are allowed to be at least one of received and transmitted by the new device, and which data and messages are allowed to be input or output by the multiprocessor system.

2. The application management system of claim 1 wherein the vehicle applications include one or more of the following:
   braking;
   audio control;
   video control;
   sensor monitoring;
   display control;
   security monitoring;
   temperature control;
   lighting control; and
   airbag monitoring.

3. The application management system of claim 1 wherein the communication system includes support for at least one of IEEE 802.11 link, a Bluetooth link, a hard-wired link, a satcom link, and a cellular link.

4. The application management system of claim 1, wherein the configuration manager is further configured to:
   monitor the vehicle applications running on the multiple processors;
   identify a failure of a high priority one of the vehicle applications operating on a first one of the multiple processors;

identify a lower priority one of the vehicle applications operating on a second one of the multiple processors; and reconfigure the multiple processors to run the high priority one of the vehicle applications on the second one of the multiple processors.

5. The application management system of claim 1 wherein the configuration manager is further configured to:

store a copy of a high priority one of the vehicle applications in a memory;

identify a failure of the high priority one of the vehicle applications on a first one of the multiple processors;

identify a second one of the multiple processors currently running another one of the vehicle applications;

download the copy of the high priority one of the vehicle applications from the memory to the second one of the multiple processors in response to identifying the failure of the high priority one of the vehicle applications on the first one of the multiple processors; and run the downloaded copy of the high priority one of the vehicle applications on the second one of the multiple processors.

6. The application management system of claim 1 wherein: the data manager is further configured to:

identify a failure of one of the vehicle applications running on a first one of the multiple processors;

store critical data generated by the vehicle application identified as failed; and configure a second one of the multiple processors to run the vehicle application; and download and process the critical data with the vehicle application running on the second one of the multiple processors in response to the failure of the identified one of the vehicle applications on the first one of the multiple processors.

7. The application management system of claim 1 further comprising a user interface configured to:

indicate a failure associated with one of the vehicle applications running on one of the multiple processors;

indicate other vehicle applications running on other ones of the multiple processors that can be replaced by the failed one of the vehicle applications.

8. The application management system of claim 1 wherein the data manager is further configured to:

identify a type of data transferred by the new hardware device;

identify an application configured to process the type of data; and display the application on a user interface.

9. A method for managing applications used in a vehicle, comprising:

adapting multiple processors located on-board the vehicle to run real-time vehicle applications;

configuring a communication system to couple the multiple processors together over multiple communication links;

configuring a device manager to automatically detect and add at least one new device to the on-board multiprocessor system, wherein the at least one new device is at least one of portable and a cell phone;

configuring a data manager to identify data generated by the new device and identify at least one other device in the multiprocessor system that can display at least some of the identified data;

running a dynamic configuration system on at least one of the multiple on-board processors, comprising:

a configuration manager configured to:

operate on the at least one of the multiple processors, store critical information about the application running on the multiple processors, automatically detect application failure, responsive to detecting application failure, initiate a reconfiguration process, download from memory the stored critical data associated with the failed application, initiate a reboot operation for the failed application; and a priority manager for determining a priority value of a message, wherein the priority value determines how messages are processed in at least one of the multiple on-board processors and the new device, responsive to determining a priority value for the message, determine which messages are allowed to be at least one of received and transmitted by the new device, and which data and messages are allowed to be input or output by the multiprocessor system.

10. The method of claim 9 wherein the vehicle applications include one or more of the following:

braking;
audio control;
video control;
sensor monitoring;
display control;
security monitoring;
temperature control;
lighting control; and
airbag monitoring.

11. The method of claim 9 wherein the communication system includes support for at least one of IEEE 802.11 link, a Bluetooth link, a hard-wired link, a satcom link, and a cellular link.

12. The method of claim 9, wherein the configuration manager is further configured to:

monitor the vehicle applications running on the multiple processors;

identify a failure of a high priority one of the vehicle applications operating on a first one of the multiple processors;

identify a lower priority one of the vehicle applications operating on a second one of the multiple processors; and reconfigure the multiple processors to run the high priority one of the vehicle applications on the second one of the multiple processors.

13. The method of claim 9 wherein the configuration manager is further configured to:

store a copy of a high priority one of the vehicle applications in a memory;

identify a failure of the high priority one of the vehicle applications on a first one of the multiple processors;

identify a second one of the multiple processors currently running another one of the vehicle applications;

download the copy of the high priority one of the vehicle applications from the memory to the second one of the multiple processors in response to identifying the failure of the high priority one of the vehicle applications on the first one of the multiple processors; and run the downloaded copy of the high priority one of the vehicle applications on the second one of the multiple processors.

14. The method of claim 9 wherein:
the data manager is further configured to:
identify a failure of one of the vehicle applications running on a first one of the multiple processors;

store critical data generated by the vehicle application identified as failed; and configure a second one of the multiple processors to run the vehicle application; and download and process the critical data with the vehicle application running on the second one of the multiple processors in response to the failure of the identified one of the vehicle applications on the first one of the multiple processors.

15. The method of claim 9 further comprising a user interface configured to:

indicate a failure associated with one of the vehicle applications running on one of the multiple processors;

indicate other vehicle applications running on other ones of the multiple processors that can be replaced by the failed one of the vehicle applications.

16. The method of claim 9 wherein the data manager is further configured to:

identify a type of data transferred by the new hardware device;

identify an application configured to process the type of data; and display the application on a user interface.

* * * * *